US008646419B2

(12) United States Patent
Kamiyama et al.

(10) Patent No.: US 8,646,419 B2
(45) Date of Patent: Feb. 11, 2014

(54) CONTROL APPARATUS FOR INTERNAL COMBUSTION ENGINE

(75) Inventors: Eiichi Kamiyama, Mishima (JP);
Daisuke Akihisa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 941 days.

(21) Appl. No.: 12/596,677

(22) PCT Filed: Apr. 18, 2008

(86) PCT No.: PCT/IB2008/000951
§ 371 (c)(1),
(2), (4) Date: Oct. 20, 2009

(87) PCT Pub. No.: WO2008/129399
PCT Pub. Date: Oct. 30, 2008

(65) Prior Publication Data
US 2010/0107995 A1 May 6, 2010

(30) Foreign Application Priority Data
Apr. 20, 2007 (JP) ................................ 2007-112261

(51) Int. Cl.
*F02B 75/04* (2006.01)
(52) U.S. Cl.
USPC .................. 123/48 R; 123/48 A; 123/48 AA; 123/48 B; 123/48 C; 123/48 D; 123/78 R; 123/78 A; 123/78 AA; 123/78 B; 123/78 BA; 123/78 C; 123/78 D; 123/78 E; 123/78 F
(58) Field of Classification Search
USPC ............................ 123/48 R–48 D, 78 R–78 F
See application file for complete search history.

(56) References Cited

U.S. PATENT DOCUMENTS

| 4,782,795 | A | * | 11/1988 | Kubozuka et al. | .......... 123/41.21 |
| 5,529,114 | A | * | 6/1996 | Hall et al. | .......... 165/41 |
| 6,553,949 | B1 | | 4/2003 | Kolmanovsky et al. | |
| 6,666,177 | B1 | | 12/2003 | Stiebels et al. | |
| 6,932,054 | B2 | * | 8/2005 | Kikori | .......... 123/347 |
| 7,802,543 | B2 | * | 9/2010 | Akihisa et al. | .......... 123/48 R |
| 2003/0111047 | A1 | * | 6/2003 | Doria et al. | .......... 123/432 |
| 2004/0074455 | A1 | | 4/2004 | Roberts, Jr. et al. | |
| 2004/0211374 | A1 | * | 10/2004 | Kamiyama | .......... 123/78 R |

FOREIGN PATENT DOCUMENTS

| DE | 199 50 682 | 4/2001 |
| EP | 1 515 025 | 3/2005 |
| EP | 1 564 392 | 8/2005 |
| JP | 2000-073803 A | 3/2000 |

(Continued)

*Primary Examiner* — Lindsay Low
*Assistant Examiner* — James Kim
(74) *Attorney, Agent, or Firm* — Oblon, Spivak, McClelland, Maier & Neustadt, L.L.P.

(57) ABSTRACT

When knocking occurs, a control apparatus for an internal combustion engine increases the rotational speed of a pump to increase the flow rate of a coolant supplied to an area near a combustion chamber wall surface, and controls an actual mechanical compression ratio to a low mechanical compression ratio lower than a mechanical compression ratio set based on the load of the engine. Thus, the pressure of end gas is decreased, and occurrence of knocking is suppressed. Then, the actual mechanical compression ratio is returned to the mechanical compression ratio at a time point at which the temperature of the combustion chamber wall surface has been sufficiently decreased due to the increase in the rotational speed. Thus, occurrence of knocking is suppressed while avoiding the situation where the actual mechanical compression ratio continues to be controlled to the low mechanical compression ratio that is lower than the mechanical compression ratio.

32 Claims, 14 Drawing Sheets

(56) References Cited

FOREIGN PATENT DOCUMENTS

| | | |
|---|---|---|
| JP | 2003-513191 A | 4/2003 |
| JP | 2003-206771 A | 7/2003 |
| JP | 2005 36729 | 2/2005 |
| JP | 2005 220843 | 8/2005 |
| JP | 2005-226571 A | 8/2005 |
| JP | 2006-177176 A | 7/2006 |
| JP | 2006-328962 A | 12/2006 |
| JP | 2007-064153 A | 3/2007 |
| WO | 2004 092560 | 10/2004 |

* cited by examiner

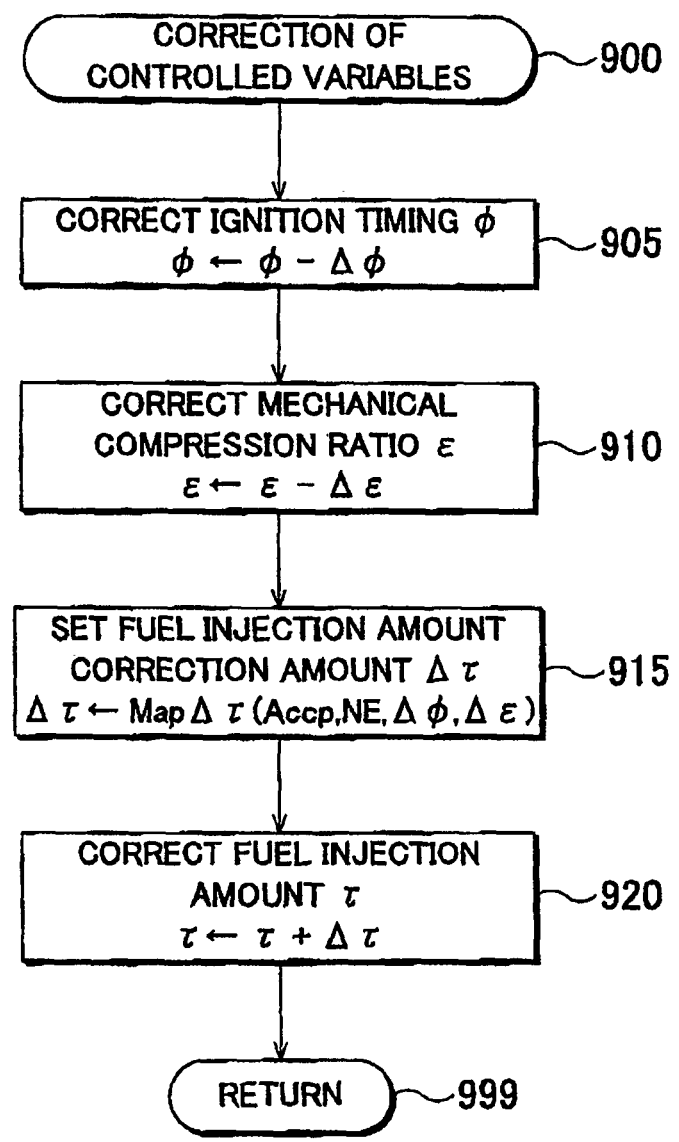

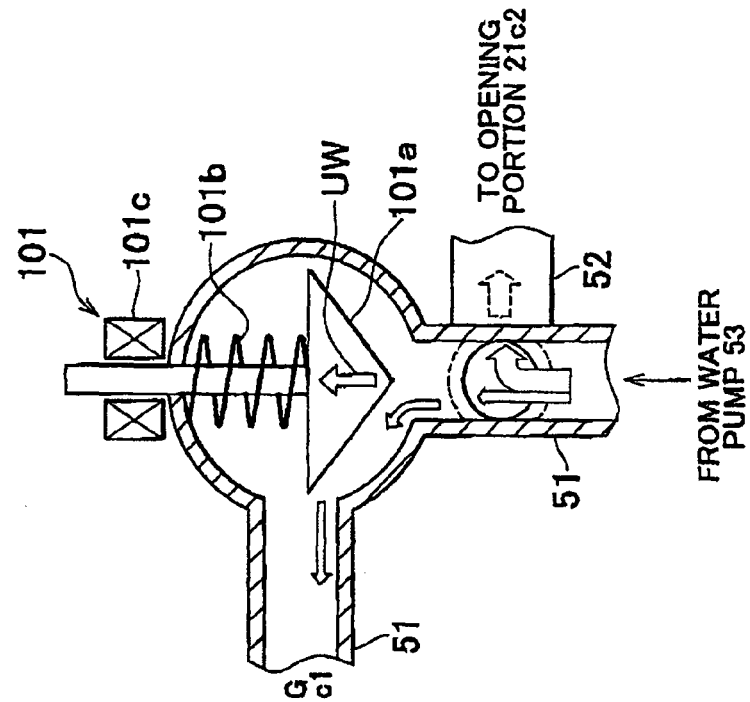
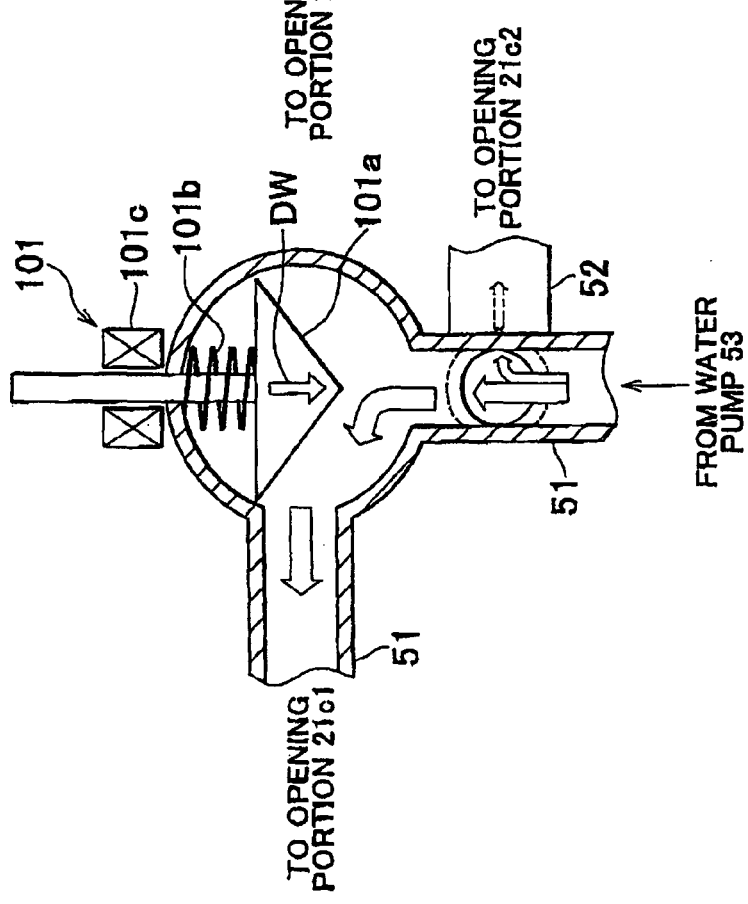

CONTROL APPARATUS FOR INTERNAL COMBUSTION ENGINE

CROSS-REFERENCE TO PRIORITY APPLICATIONS

The present application claims priority to Japanese patent application no. 2007/112261 filed on Apr. 20, 2007, the entire contents of which are hereby incorporated herein by reference.

BACKGROUND OF THE INVENTION

1. Field of the Invention

The invention relates to a control apparatus for an internal combustion engine that includes a compression ratio change device that changes a mechanical compression ratio, wherein the mechanical compression ratio is a ratio of a maximum value of a volume of a combustion chamber to a minimum value of the volume of the combustion chamber, and the volume of the combustion chamber is changed according to the reciprocating movement of a piston.

2. Description of the Related Art

A control apparatus for an internal combustion engine that includes a compression ratio change device is available. The compression ratio change device changes a mechanical compression ratio of the internal combustion engine. Generally, when the temperature and pressure of mixed gas (end gas) located near a wall surface constituting a combustion chamber (for example, a bore wall surface) are extremely high, the end gas is strongly burned after the mixed gas is ignited. Thus, knocking occurs. When knocking occurs, the heat efficiency of the internal combustion engine is greatly decreased, and the wall surface constituting the combustion chamber (for example, a cylinder head) may be molten and damaged.

As the load of the internal combustion engine decreases, an amount of fuel in the mixed gas formed in the combustion chamber is decreased, and therefore, heat energy generated by combustion of the mixed gas is decreased. As a result, the wall surface constituting the combustion chamber is heated by the heat energy generated by combustion of the mixed gas, to a smaller extent, and therefore, the end gas is heated by the wall surface to a smaller extent before the end gas is burned. Further, as the load of the internal combustion engine decreases, the amount of mixed gas formed in the combustion chamber is decreased, and therefore, the temperature of the mixed gas is increased to a smaller extent when the mixed gas is compressed by the piston. Accordingly, as the load of the internal combustion engine decreases, knocking is less likely to occur.

Thus, Japanese Patent Application Publication No. 2006-177176 (JP-A-2006-177176) describes an example of the control apparatus that controls the compression ratio change device to increase the actual mechanical compression ratio as the load of the internal combustion engine decreases. Accordingly, when the load of the internal combustion engine is relatively low, the mechanical compression ratio is controlled to be relatively high. This increases the heat efficiency of the internal combustion engine. As a result, it is possible to operate the internal combustion engine with good fuel efficiency, while avoiding occurrence of knocking.

Further, when knocking occurs, the control apparatus controls the compression ratio change device so that the actual mechanical compression ratio is lower than the mechanical compression ratio set based on the load. This decreases the pressure of the end gas, thereby suppressing occurrence of knocking.

However, the above-described conventional control apparatus continues to control the actual mechanical compression ratio to the mechanical compression ratio that is lower than the mechanical compression ratio set based on the load, after knocking occurs. Therefore, an increase in the fuel efficiency may be inhibited.

SUMMARY OF THE INVENTION

The invention provides a control apparatus and a control method for an internal combustion engine, which suppress occurrence of knocking, while avoiding inhibition of an increase in fuel efficiency.

An aspect of the invention provides a control apparatus for an internal combustion engine that is provided in a vehicle, and that includes a compression ratio change device that changes an actual mechanical compression ratio, wherein the mechanical compression ratio is a ratio of a maximum value of a volume of a combustion chamber to a minimum value of the volume of the combustion chamber, and the volume of the combustion chamber is changed according to reciprocating movement of a piston.

The control apparatus for the internal combustion engine includes: a compression ratio control device that controls the compression ratio change device so that the actual mechanical compression ratio is equal to the mechanical compression ratio set based on a load of the internal combustion engine; a cooling device that cools a wall surface that constitutes the combustion chamber using a cooling medium, by supplying the cooling medium to an area near the wall surface, and that adjusts cooling efficiency that indicates a magnitude of heat energy transferred to the supplied cooling medium from the wall surface per unit time; an index value obtaining device that obtains an index value relating to occurrence of knocking; and a knocking suppression device that determines whether a knocking determination condition, which includes at least one of a condition that knocking occurs and a condition that there is a possibility that knocking will occur, is satisfied based on the obtained index value, wherein when the knocking suppression device determines that the knocking determination condition is satisfied, the knocking suppression device controls the cooling device to increase the cooling efficiency, and controls the compression ratio change device so that the actual mechanical compression ratio is equal to a low mechanical compression ratio that is lower than the mechanical compression ratio set based on the load, in a predetermined low compression ratio control period that starts at a knocking determination time point at which it is determined that the knocking determination condition is satisfied.

The cooling efficiency is adjusted, for example, by changing the flow rate of the cooling medium, the temperature of the cooling medium, or the like. Thus, the actual cooling efficiency is increased when a predetermined delay time elapses after the cooling device is controlled to increase the cooling efficiency. Therefore, the temperature of the combustion chamber wall surface is not sufficiently decreased until the predetermined period elapses after the cooling device is controlled.

Accordingly, in the above-described configuration, when it is determined that the knocking determination condition is satisfied, the cooling device is controlled to increase the cooling efficiency, and the actual mechanical compression ratio is controlled to the low mechanical compression ratio that is lower than the mechanical compression ratio set based on the load of the internal combustion engine, in the predetermined low compression ratio control period that starts at the knocking determination time point. Thus, the pressure of end gas is decreased, and therefore, occurrence of knocking is suppressed, in the low compression ratio control period.

Then, the actual cooling efficiency has been sufficiently increased at the end time point of the low compression ratio control period. Thus, the temperature of the wall surface constituting the combustion chamber (i.e., the combustion chamber wall surface) has been sufficiently decreased. As a result, the temperature of the end gas is not excessively increased, and therefore, occurrence of knocking is suppressed.

After the end time point of the low compression ratio control period, the actual mechanical compression ratio is controlled to the mechanical compression ratio set based on the load of the internal combustion engine. Thus, it is possible to suppress occurrence of knocking, while avoiding the situation where the actual mechanical compression ratio continues to be controlled to the low mechanical compression ratio that is lower than the mechanical compression ratio set based on the load. That is, it is possible to suppress occurrence of knocking, while avoiding inhibition of an increase in the fuel efficiency.

In this case, the knocking suppression device may set the low mechanical compression ratio to a first low mechanical compression ratio during a first period from the knocking determination time point to a predetermined first time point, in the low compression ratio control period; and the knocking suppression device may set the low mechanical compression ratio to a second low mechanical compression ratio that is higher than the first low mechanical compression ratio during a second period after the first time point, in the low compression ratio control period.

Thus, the mechanical compression ratio is controlled to the first low mechanical compression ratio that is a sufficiently low mechanical compression ratio during the period until the temperature of the combustion chamber wall surface is decreased to some extent. Therefore, it is possible to more reliably suppress occurrence of knocking.

Then, the temperature of the combustion chamber wall surface is decreased to a temperature at which there is a relatively high possibility that knocking will occur when the actual mechanical compression ratio is controlled to the mechanical compression ratio set based on the load, and at which knocking does not occur when the actual mechanical compression ratio is controlled to a mechanical compression ratio that is closer to the mechanical compression ratio set based on the load than the first low mechanical compression ratio is.

Accordingly, in the above-described configuration, the actual mechanical compression ratio is controlled to the second low mechanical compression ratio that is higher than the first low mechanical compression ratio during the second period. Thus, it is possible to increase the fuel efficiency, while suppressing occurrence of knocking, as compared to the case where the actual mechanical compression ratio is controlled to the first low mechanical compression ratio over the entire low compression ratio control period.

In this case, the knocking suppression device may maintain the first low mechanical compression ratio at a constant value during the first period; and the knocking suppression device may gradually increase the second low mechanical compression ratio toward the mechanical compression ratio set based on the load, as time elapses, during the second period.

The temperature of the combustion chamber wall surface is maintained at a substantially constant value during the period from when the cooling device is controlled to increase the cooling efficiency until when a predetermined delay time elapses (i.e., during the period until the cooling efficiency starts to be increased). Accordingly, by maintaining the first low mechanical compression ratio at a constant value during the first period as in the above-described configuration, it is possible to reliably suppress occurrence of knocking.

Then, the cooling efficiency is gradually increased as time elapses. Thus, the temperature of the combustion chamber wall surface is gradually decreased, and therefore, the possibility of occurrence of knocking is also decreased, as time elapses. Accordingly, in the above-described configuration, the second low mechanical compression ratio is gradually increased as time elapses. Thus, it is possible to increase the fuel efficiency, while more reliably suppressing occurrence of knocking, as compared to the case where the low mechanical compression ratio is maintained at a constant value during the second period.

In this case, the cooling device may adjust the cooling efficiency by changing a flow rate of the supplied cooling medium.

In this case, the cooling medium may be a coolant; and the cooling device may include an electric pump that supplies the coolant to the area near the wall surface by discharging the coolant when the pump is driven by electric power.

In the control apparatus for the internal combustion engine according to another aspect of the invention, the cooling medium may be a coolant; the cooling device may include an electric pump to which electric power is supplied, and which includes a rotor that is rotated at a rotational speed corresponding to the electric power supplied to the pump; when the rotor is rotated, the pump may supply the coolant to the area near the wall surface by discharging the coolant at a higher flow rate as the rotational speed of the rotor becomes higher; and the knocking suppression device may control the cooling device by controlling the electric power supplied to the pump, and may set the first time point to a time point at which the rotational speed of the rotor becomes equal to a predetermined threshold rotational speed.

Thus, as the rotational speed of the rotor of the pump increases, the flow rate of the coolant supplied to the area near the combustion chamber wall surface is increased. That is, the rotational speed of the rotor is closely correlated with the cooling efficiency. Accordingly, by setting the first time point to the time point at which the rotational speed of the rotor becomes equal to the threshold rotational speed as in the above-described configuration, it is possible to increase the actual mechanical compression ratio after the cooling efficiency is sufficiently increased. Therefore, it is possible to increase the fuel efficiency, while more reliably suppressing occurrence of knocking.

In the control apparatus for the internal combustion engine according to another aspect of the invention, the cooling device may include an electric pump to which electric power is supplied, and which includes a rotor that is rotated at a rotational speed corresponding to the electric power supplied to the pump; when the rotor is rotated, the pump may supply the coolant to the area near the wall surface by discharging the coolant at a higher flow rate as the rotational speed of the rotor becomes higher; and the knocking suppression device may control the cooling device by controlling the electric power supplied to the pump, and may increase the low mechanical compression ratio as the rotational speed of the rotor increases.

As described above, as the rotational speed of the rotor increases, the flow rate of the coolant supplied to the area near the combustion chamber wall surface is increased, and therefore, the cooling efficiency is increased. Accordingly, by increasing the low mechanical compression ratio as the rotational speed of the rotor increases as in the above-described configuration, it is possible to increase the fuel efficiency as much as possible, while suppressing occurrence of knocking.

In the case where the cooling device includes the pump, in the internal combustion engine, a fixed member, which is one of a cylinder block and a crankcase, may be fixed to the vehicle, and a movable member, which is the other of the cylinder block and the crankcase, may be movable relative to the fixed member; the compression ratio change device may change the actual mechanical compression ratio by moving the movable member relative to the fixed member; and the pump may be fixed to a member that is not moved relative to the fixed member when the compression ratio change device changes the actual mechanical compression ratio.

For example, the pump is fixed to the fixed member that functions as the member that is not moved relative to the fixed member when the compression ratio change device changes the actual mechanical compression ratio, or the pump is fixed to the vehicle. Thus, it is possible to reduce the weight of the member that is moved when the actual mechanical compression ratio is changed, as compared to the case where the pump is fixed to the movable member that is moved when the actual mechanical compression ratio is changed. Accordingly, it is possible to reduce energy consumed by moving the member that changes the actual mechanical compression ratio. This increases the fuel efficiency.

In the control apparatus for the internal combustion engine according to another aspect of the invention, the cooling device may adjust the cooling efficiency by changing a temperature of the supplied coolant.

In the control apparatus for the internal combustion engine according to any one of the aspects, the index value obtaining device may obtain the index value by detecting at least one of a temperature of the cooling medium, a temperature of air introduced into the combustion chamber, a pressure of gas in the combustion chamber, and vibration of the internal combustion engine as the index value.

As the temperature of the cooling medium increases, the cooling efficiency is decreased. Thus, as the temperature of the cooling medium increases, the temperature of the combustion chamber wall surface is increased, and therefore, knocking is more likely to occur. That is, the temperature of the cooling medium is closely correlated with occurrence of knocking. Also, as the temperature of air introduced into the combustion chamber (for example, the temperature of air in an intake pipe) increases, the temperature of the end gas is increased, and therefore, knocking is more likely to occur. That is, the temperature of air introduced into the combustion chamber is also closely correlated with occurrence of knocking. Also, as the pressure of gas in the combustion chamber (cylinder pressure) increases, the pressure of the end gas is increased, and therefore, knocking is more likely to occur. That is, the pressure of the gas in the combustion chamber is also closely correlated with occurrence of knocking.

Further, when knocking occurs, the internal combustion engine vibrates at a relatively high frequency. Accordingly, the vibration of the internal combustion engine is closely correlated with occurrence of knocking. In addition, when knocking occurs, the pressure of the gas in the combustion chamber is sharply increased. Accordingly, the pressure of the gas in the combustion chamber is also closely correlated with occurrence of knocking.

Thus, in the above-described configuration, the index value is obtained by detecting at least one of the temperature of the cooling medium, the temperature of air introduced into the combustion chamber, the pressure of the gas in the combustion chamber, and the vibration of the internal combustion engine as the index value, and it is determined whether the knocking determination condition is satisfied based on the obtained index value. Thus, it is possible to appropriately determine whether the knocking determination condition is satisfied.

In this case, the control apparatus for the internal combustion engine may further include an ignition device that ignites mixed gas formed in the combustion chamber; and an ignition timing control device that controls the ignition device so that the ignition device actually ignites the mixed gas at an ignition timing set based on the load. When the knocking suppression device determines that the knocking determination condition is satisfied, the knocking suppression device may control the ignition device so that the ignition device actually ignites the mixed gas at a retarded ignition timing that is more retarded than the ignition timing set based on the load, in a predetermined ignition timing retarding control period that starts at the knocking determination time point.

In the above-described control apparatus, the mechanical compression ratio is decreased at the knocking determination time point. However, for example, the cylinder block needs to be moved relative to the crankcase, to change the actual mechanical compression ratio. Accordingly, the actual mechanical compression ratio is changed after a predetermined control delay time elapses. That is, the actual mechanical compression ratio remains relatively high during a period immediately after the knocking determination time point. Thus, knocking may occur.

However, in the above-described configuration, the ignition timing is controlled to the retarded ignition timing that is more retarded than the ignition timing set based on the load, at the knocking determination time point. Thus, the pressure of the end gas is decreased, and therefore, occurrence of knocking is suppressed.

In this case, the knocking suppression device may set the retarded ignition timing to a first retarded ignition timing during a period until a second time point that is later than a time point at which the actual mechanical compression ratio starts to be increased, in the ignition timing retarding control period; and the knocking suppression device may set the retarded ignition timing to a second retarded ignition timing that is more advanced than the first retarded ignition timing during a period after the second time point, in the ignition timing retarding control period.

Thus, the actual ignition timing is controlled to the first retarded ignition timing that is the sufficiently retarded timing, during the period from the knocking determination time point to the second time point. This reduces the possibility of occurrence of knocking. Accordingly, it is possible to suppress occurrence of knocking even when the actual mechanical compression ratio quickly approaches the mechanical compression ratio set based on the load of the internal combustion engine. That is, it is possible to more quickly make the actual mechanical compression ratio approach the mechanical compression ratio set based on the load of the internal combustion engine, while suppressing occurrence of knocking. This increases the fuel efficiency.

Then, during the period after the second time point, the cooling efficiency is sufficiently increased, and therefore, the temperature of the combustion chamber wall surface is sufficiently decreased. Accordingly, in the above-described configuration, the actual ignition timing is controlled to the second retarded ignition timing that is more advanced than the first retarded ignition timing. Thus, it is possible to increase the fuel efficiency, as compared to the case where the ignition timing is controlled to the first retarded ignition timing over the entire ignition timing retarding control period.

In this case, the knocking suppression device may set an end time point of the ignition timing retarding control period to a time point after an end time point of the low compression ratio control period.

Thus, after the low compression ratio control period ends, the ignition timing retarding control period ends. Accordingly, the actual ignition timing is controlled to the retarded ignition timing during the period in which the actual mechanical compression ratio is controlled to the low mechanical compression ratio. This reduces the possibility of occurrence of knocking.

Accordingly, it is possible to suppress occurrence of knocking even when the actual mechanical compression ratio quickly approaches the mechanical compression ratio set based on the load of the internal combustion engine. That is, it is possible to more quickly make the actual mechanical compression ratio approach the mechanical compression ratio set based on the load of the internal combustion engine, while suppressing occurrence of knocking. This increases the fuel efficiency.

In this case, the compression ratio control device may set the mechanical compression ratio based on the load so that the mechanical compression ratio is increased as the load decreases; the compression ratio control device may open an exhaust valve so that an actual expansion ratio is increased as the load decreases; the actual expansion ratio may be a ratio of the volume of the combustion chamber at a time point at which the exhaust valve is opened, to a top dead center combustion chamber volume that is the volume of the combustion chamber at a time point at which the piston is located at a top dead center; the compression ratio control device may close an intake valve so that an actual compression ratio is maintained at a substantially constant value regardless of the load; and the actual compression ratio may be a ratio of the volume of the combustion chamber (CC) at a time point at which the intake valve is closed, to the top dead center combustion chamber volume.

Thus, as the load decreases, the actual expansion ratio is increased, and therefore, a period during which combustion gas generated by burning the mixed gas works on the piston is increased. This increases heat efficiency. As a result, the fuel efficiency is increased.

Further, the actual compression ratio is maintained at a substantially constant value, regardless of the load. As a result, it is possible to avoid an increase in the possibility of occurrence of knocking even when the mechanical compression ratio is increased due to the decrease in the load. Thus, it is possible to increase the fuel efficiency, while suppressing occurrence of knocking when the load is relatively low.

In this case, the internal combustion engine may be a multi-cylinder internal combustion engine that includes a plurality of cylinders; the compression ratio change device may simultaneously change the actual mechanical compression ratio of each of the cylinders to a same value; the index value obtaining device may obtain the index value for each of the cylinders; the cooling device may adjust the cooling efficiency for each of the cylinders; the knocking suppression device may determine whether the knocking determination condition is satisfied based on the obtained index value for each of the cylinders; when the knocking suppression device determines that the knocking determination condition is satisfied in at least one cylinder among the cylinders, the knocking suppression device may control the cooling device so that the cooling efficiency for the at least one cylinder in which the knocking determination condition is satisfied is higher than the cooling efficiency for at least one cylinder among the cylinders, in which the knocking determination condition is not satisfied.

In the internal combustion engine that includes a plurality of cylinders, knocking is likely to occur repeatedly in a specific cylinder. Accordingly, in the above-described configuration, when the knocking determination condition is satisfied in at least one cylinder, the cooling efficiency for the at least one cylinder in which the knocking determination condition is satisfied is made higher than the cooling efficiency for at least one cylinder in which the knocking determination condition is not satisfied. Thus, it is possible to suppress occurrence of knocking in the at least one cylinder in which the knocking determination condition is satisfied. In other words, because the possibility of occurrence of knocking in each cylinder is made substantially the same, it is possible to avoid the situation where the mechanical compression ratio of the entire engine cannot be increased due to at least one cylinder in which knocking is likely to occur.

BRIEF DESCRIPTION OF THE DRAWINGS

The features, advantages and technical and industrial significance of this invention will be better understood by reading the following detailed description of embodiments of the invention, when considered in connection with the accompanying drawings, in which:

FIG. 9 is a flowchart showing a program that is executed by the CPU shown in FIG. 1 to correct the controlled variables;

FIGS. 11A and 11B are explanation diagrams, each of which conceptually shows the flow of a coolant in the cooling system according to the modified example of the first embodiment of the invention;

DETAILED DESCRIPTION OF EMBODIMENTS

In the following description and the accompanying drawings, the present invention will be described in greater detail with reference to example embodiments.

Figure 1:
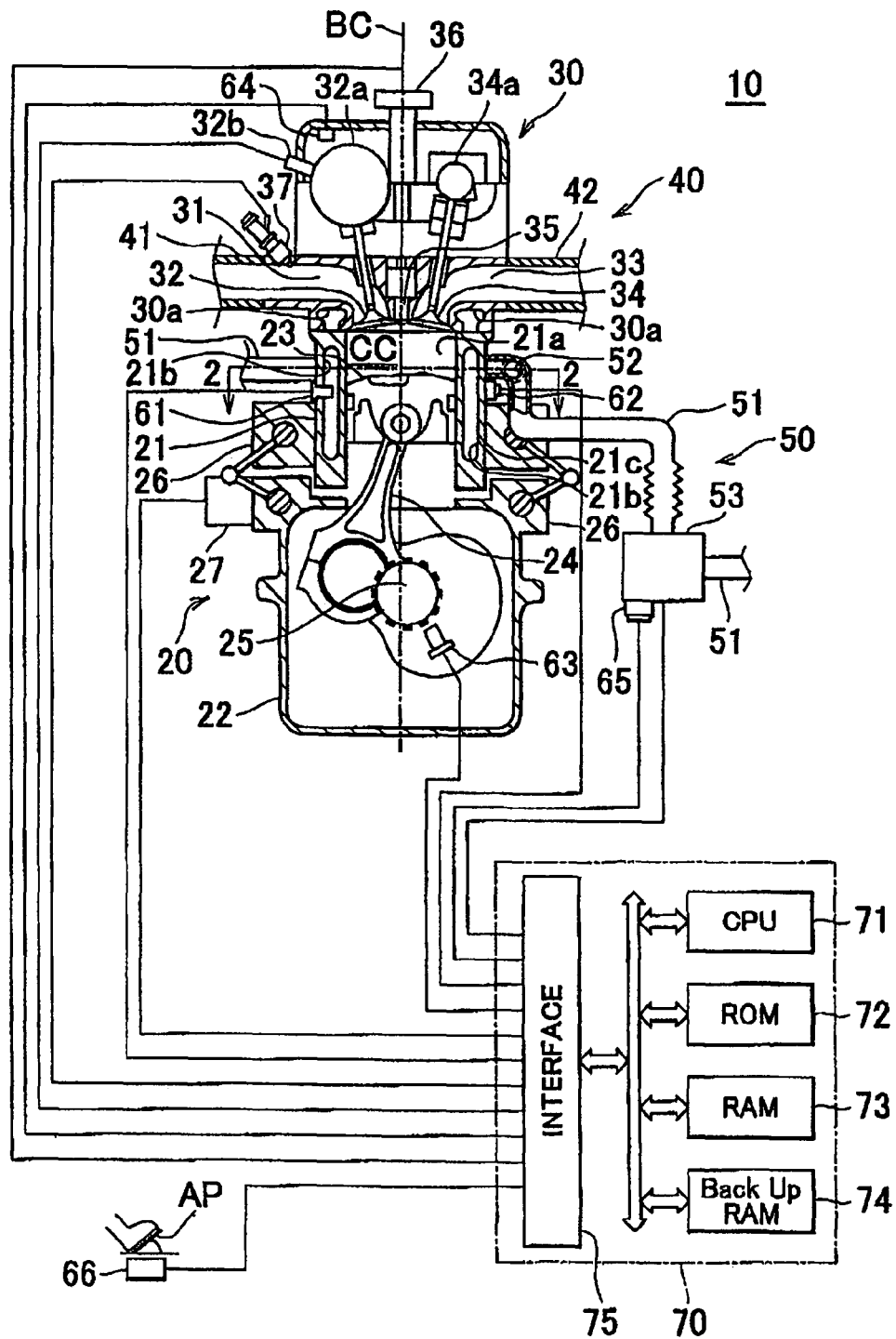
FIG. 1 is a schematic configuration diagram of a system to which a control apparatus for an internal combustion engine according to a first embodiment of the invention is applied to a spark-ignition multi-cylinder internal combustion engine.

A first embodiment of the invention will be described. FIG. 1 schematically shows the configuration of a system in which a control apparatus according to the first embodiment of the invention is applied to a spark-ignition multi-cylinder (four-cylinder) internal combustion engine. FIG. 1 shows a cross section of only a specific cylinder. However, other cylinders have the same configuration.

The internal combustion engine 10 is provided in a vehicle (not shown). The internal combustion engine 10 includes a cylinder block portion 20, a cylinder head portion 30, an intake/exhaust system 40, and a cooling system 50 that constitutes a part of the cooling device.

The cylinder block portion 20 includes a cylinder block 21 that functions as the movable member, a crankcase 22 that functions as the fixed member, pistons 23, connection rods 24, and a crankshaft 25.

Figure 2:
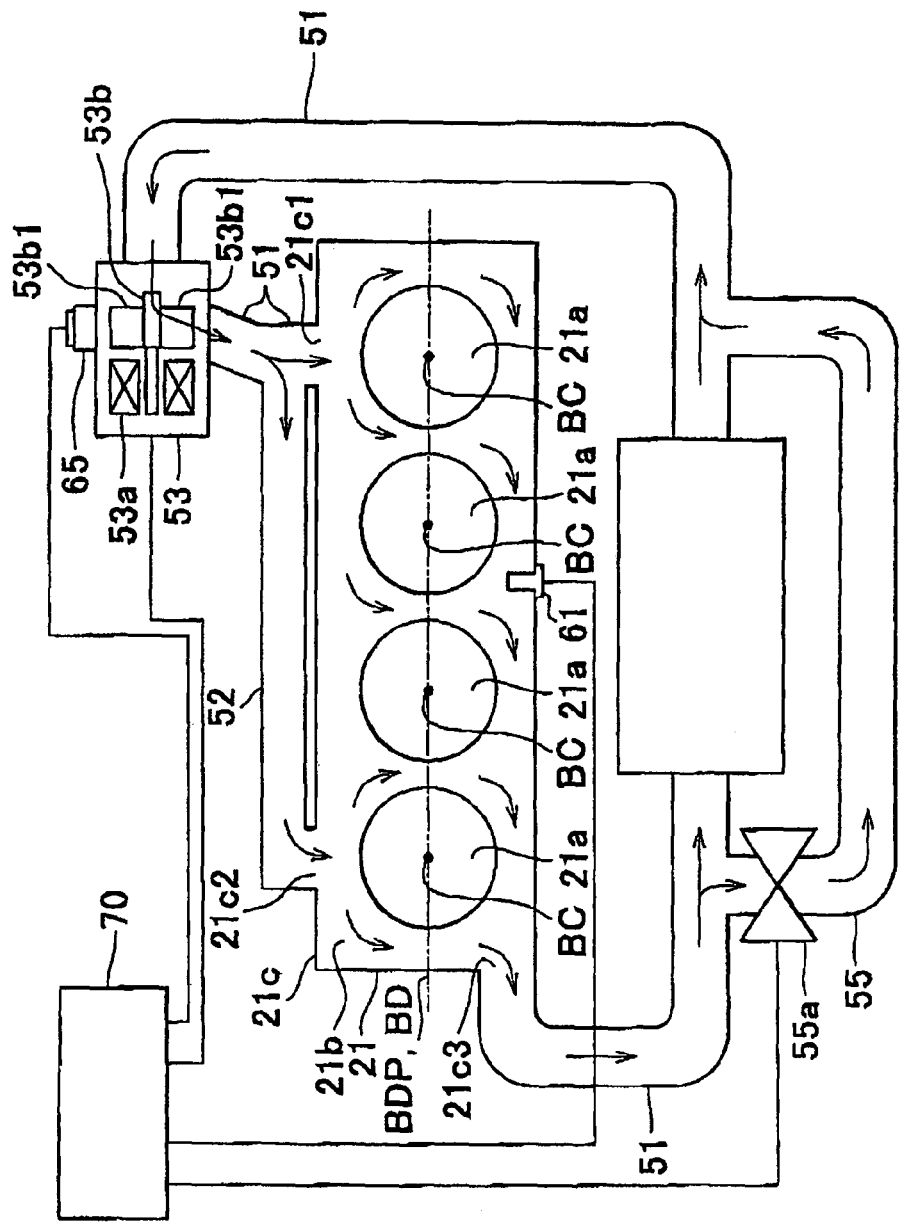
FIG. 2 is a schematic configuration diagram of an entire cooling system, a part of which is shown in FIG. 1.

FIG. 2 is a schematic diagram showing a cross section of the cylinder block 21 taken along a plane extending along the line 2-2 in FIG. 1. As shown in FIG. 1 and FIG. 2, a plurality of cylinder bores 21a (four cylinder bores 21a in the embodiment) are formed in the cylinder block 21. Each cylinder bore 21a is a columnar hole that extends through the cylinder block 21 in a bore central axis direction BC. The bore central axes BC of all the cylinder bores 21a are positioned in one plane (bore central axis arrangement plane) BDP.

Further, in the cylinder block 21, a block-side water jacket 21b, which constitutes a part of the cooling device, is formed. The block-side water jacket 21b is a passage through which a coolant passes. The block-side water jacket 21b is disposed to surround all the cylinder bores 21a.

As shown in FIG. 2, two opening portions 21c1 and 21c2 are formed in a side surface 21c that is one side surface of the cylinder block 21, and that is parallel to the bore central axis arrangement plane BDP. The opening portions 21c1 and 21c2 are connected to the block-side water jacket 21b. The opening portions 21c1 and 21c2 are disposed close to respective end portions of the side surface 21c in a bore central axis arrangement direction BD that is parallel to the bore central axis arrangement plane BDP, and that is orthogonal to the bore central axis direction BC.

The crankcase 22 is fixed to the vehicle (i.e., the vehicle body of the vehicle). As shown in FIG. 1, the crankcase 22 is disposed adjacent to the cylinder block 21 in the bore central axis direction BC. The crankcase 22 houses a crankshaft 25, and rotatably supports the crankshaft 25.

The crankcase 22 and the cylinder block 21 are configured in a manner such that the cylinder block 21 is movable relative to the crankcase 22 in the bore central axis direction BC. Hereinafter, in this specification, a direction from the cylinder block 21 toward the crankcase 22 will be referred to as "downward direction", and a direction from the crankcase 22 toward the cylinder block 21 will be referred to as "upward direction".

The piston 23 is housed in the cylinder bore 21a. The piston 23 is reciprocated in the cylinder bore 21a. The reciprocating movement of the piston 23 is transmitted to the crankshaft 25 through the connecting rod 24. Thus, the crankshaft 25 is rotated.

Further, the cylinder block portion 20 includes a compression ratio change device 26 that functions as the compression ratio change device, and a compression ratio control device 27. The detail of the mechanism is well known, and described in, for example, Japanese Patent Application Publication No. 2003-206771 (JP-A-2003-206771) and Japanese Patent Application Publication No. 2007-056837 (JP-A-2007-056837). Accordingly, in the specification, the detailed description of the mechanism will be omitted, and only the general configuration of the mechanism will be described.

The compression ratio change device 26 connects the cylinder block 21 to the crankcase 22. The compression ratio change device 26 is driven by the compression ratio control device 27 to move the cylinder block 21 relative to the crankcase 22 in the bore central axis direction BC, thereby changing a distance between the cylinder block 21 and the crankcase 22 in the bore central axis direction BC.

The cylinder head portion 30 is fixed to the upper portion of the cylinder block 21. With the configuration, a combustion chamber CC is formed by a wall surface that constitutes the cylinder bore 21a (i.e., a bore wall surface), the head of the piston 23, and the lower surface of the cylinder head portion 30. Further, when the compression ratio change device 26 moves the cylinder block 21 relative to the crankcase 22 in the bore central axis direction BC, the actual mechanical compression ratio of the internal combustion engine 10 is changed. The mechanical compression ratio of the internal combustion engine 10 is a ratio of the maximum value of the volume of the combustion chamber CC to the minimum value of the volume of the combustion chamber CC. The volume of the combustion chamber CC is changed according to the reciprocating movement of the piston 23. That is, the actual mechanical compression ratio of each of the cylinders is simultaneously changed to the same value.

The cylinder head portion 30 includes intake ports 31 connected to the respective combustion chambers CC; intake valves 32 that open/close the respective intake ports 31; a variable intake timing device 32a that includes an intake camshaft that drives the intake valves 32, and that continuously changes the phase angle of the intake camshaft; an actuator 32b for the variable intake timing device 32a; exhaust ports 33 connected to the respective combustion chambers CC; exhaust valves 34 that open/close the respective exhaust ports 33; an exhaust camshaft 34a that drives the exhaust valves 34; ignition plugs 35 that generate sparks in the respective combustion chambers CC when high voltage is applied to the ignition plugs 35; igniters 36 that include ignition coils that generate the high voltage to be applied to the respective ignition plugs 35; and injectors 37 that inject fuel into the respective intake ports 31 so that the fuel is supplied to the respective combustion chambers CC in response to instruction signals. The ignition plug 35 and the igniter 36 constitute the ignition device that ignites mixed gas formed in the combustion chamber CC.

In the cylinder head portion 30, a head-side water jacket 30a that constitutes a part of the cooling device is formed. The head-side water jacket 30a is a passage through which the coolant passes. The head-side water jacket 30a is disposed to surround the combustion chambers CC of all the cylinders. The head-side water jacket 30a is connected to the block-side water jacket 21b at a plurality of positions.

The intake/exhaust system 40 includes an intake manifold 41 and an exhaust manifold 42. The intake manifold 41 is fixed to the cylinder head portion 30. In the intake manifold 41, a plurality of independent passages are formed. The plurality of passages are connected to the intake ports 31 of the respective cylinders. The intake manifold 41 is connected to an intake pipe (not shown) through which air taken from an outside of the internal combustion engine 10 is introduced into the cylinder block portion 20.

The exhaust manifold 42 is fixed to the cylinder head portion 30. In the exhaust manifold 42, a plurality of independent passages are formed. The plurality of passages are connected to the exhaust ports 33 of the respective cylinders. The exhaust manifold 42 is connected to an exhaust pipe (not shown) through which exhaust gas discharged from the cylinder block portion 20 is discharged to the outside of the internal combustion engine 10.

As shown in FIG. 2, the cooling system 50 includes a circulation pipe 51, a branch pipe 52, an electric water pump 53, and a radiator 54.

One end of the circulation pipe 51 is connected to the cylinder block 21 so that the inner space of the circulation pipe 51 is connected to the block-side water jacket 21b through the opening portion 21c1.

The other end of the circulation pipe 51 is connected to the cylinder block 21 through an opening portion 21c3 so that the inner space of the circulation pipe 51 is connected to the block-side water jacket 21b. In the cross section of the cylinder block 21 taken along a plane orthogonal to the bore central axis direction BC, the opening portion 21c3 is formed in a corner portion of the cylinder block 21 that is diagonally opposite to a corner portion of the cylinder block 21 that is closest to the opening portion 21c1.

One end of the branch pipe 52 is connected to the circulation pipe 51 at a position close to the opening portion 21c1 so that the inner space of the branch pipe 52 is connected to the inner space of the circulation pipe 51. The other end of the branch pipe 52 is connected to the cylinder block 21 so that the inner space of the branch pipe 52 is connected to the block-side water jacket 21b through the opening portion 21c2.

The water pump 53 is disposed in the circulation pipe 51 at a position upstream of a position where the branch pipe 52 is connected to the circulation pipe 51 in a direction in which the coolant flows toward the cylinder block 21. The water pump 53 is connected to a power source (not shown). The power source supplies electric power.

The water pump 53 includes a motor 53a and a rotor 53b. The motor 53a includes a rotational shaft. In the motor 53a, the rotational shaft is rotated at higher torque, as the electric power supplied to the motor 53a becomes higher. The rotor 53b is rotated integrally with the rotational shaft. The rotor 53b includes a plurality of blades 53b1. The water pump 53 compresses and discharges the coolant using the blades 53b1 when the rotor 53b is rotated. With the configuration, the water pump 53 discharges the coolant at a higher flow rate, as the rotational speed of the rotor 53b becomes higher.

The water pump 53 is fixed to the vehicle, as well as the crankcase 22. That is, the water pump 53 is fixed to the member (vehicle body) that is not moved relative to the crankcase 22 that is the fixed member, when the compression ratio change device 26 changes the actual mechanical compression ratio. The water pump 53 may be fixed to the crankcase 22.

Thus, it is possible to reduce the weight of the member that is moved when the actual mechanical compression ratio is changed, as compared to the case where the water pump 53 is fixed to the cylinder block portion 20 that is moved when the actual mechanical compression ratio is changed. Accordingly, it is possible to reduce the energy consumed by moving the member to change the actual mechanical compression ratio. As a result, fuel efficiency is increased.

The radiator 54 is disposed in the circulation pipe 51 at a position upstream of the water pump 53 in the direction in which the coolant flows toward the cylinder block 21. The radiator 54 cools the coolant in the circulation pipe 51 by radiating the heat of the coolant to the atmosphere.

With the configuration, the coolant is circulated in the block-side water jacket 21b, the head-side water jacket 30a, and the cooling system 50. Accordingly, the coolant in the block-side water jacket 21b and the head-side water jacket 30a receives heat from the wall surface constituting the combustion chamber CC (i.e., the combustion chamber wall surface that includes, for example, the bore wall surface and the lower surface of the cylinder head portion 30), and thus, the combustion chamber wall surface is cooled by the coolant.

Further, the cooling system 50 includes a bypass pipe 55 and a bypass flow rate regulating valve 55a. One end of the bypass pipe 55 is connected to the circulation pipe 51 at a position upstream of the radiator 54. The other end of the bypass pipe 55 is connected to the circulation pipe 51 at a position downstream of the radiator 54. That is, the bypass pipe 55 constitutes a passage through which the coolant in the circulation pipe 51 flows to bypass the radiator 54.

The bypass flow rate regulating valve 55a is a thermostat valve. By changing an opening degree (not shown) of the bypass flow rate regulating valve 55a, the flow rate of the coolant flowing into the radiator 54 and the flow rate of the coolant bypassing the radiator 54 are adjusted. The opening degree of the bypass flow rate regulating valve 55a is decreased as the temperature of the coolant flowing near the bypass flow rate regulating valve 55a increases. With the configuration, the bypass flow rate regulating valve 55a maintains a temperature Tw of the coolant (i.e., a coolant temperature Tw) at a substantially constant value, by increasing the flow rate of the coolant flowing into the radiator 54 as the temperature of the coolant increases.

As shown in FIG. 1, the system includes a coolant temperature sensor 61, a knock sensor 62 that functions as the index value obtaining device, a crank position sensor 63, a cam position sensor 64, a pump rotational speed sensor 65, an accelerator-pedal operation amount sensor 66, and an electric control unit 70.

The coolant temperature sensor 61 detects the temperature Tw of the coolant (i.e., the coolant temperature Tw) in the block-side water jacket 21b, and outputs a signal indicating the coolant temperature Tw. The knock sensor 62 detects vibration Vc of the cylinder block portion 20 as an index value relating to occurrence of knocking, and outputs a signal indicating the vibration Vc.

The crank position sensor 63 outputs a signal including a short-duration pulse that occurs each time the crankshaft 25 is rotated by 10 degrees, and a long-duration pulse that occurs each time the crankshaft 25 is rotated by 360 degrees. The signal indicates an engine speed NE. The cam position sensor 64 outputs a signal (G2 signal) including a pulse that occurs each time the intake camshaft is rotated by 90 degrees (that is, each time the crankshaft 25 is rotated by 180 degrees).

The pump rotational speed sensor 65 outputs a signal each time the rotor 53b of the water pump 53 is rotated by 360 degrees. The signal indicates an actual pump rotational speed NPa. The accelerator-pedal operation amount sensor 66 detects an operation amount Accp of an accelerator pedal AP operated by the driver, and outputs a signal indicating the operation amount Accp of the accelerator pedal AP (i.e., an accelerator-pedal operation amount Accp).

The electric control unit 70 is a microcomputer that includes a CPU 71, a ROM 72, a RAM 73, a backup RAM 74, and an interface 75 including an AD converter. The CPU 71, the ROM 72, the RAM 73, the backup RAM 74, and the interface 75 are connected to each other by a bus. Programs executed by the CPU 71, tables (lock-up tables, and maps), constants, and the like are stored in the ROM 72 in advance. The CPU 71 temporarily stores data in the RAM 73 according to need. When electric power is supplied to the backup RAM 74, data is stored in the backup RAM 74. In addition, when the supply of electric power to the backup RAM 74 is interrupted, the data stored in the backup RAM 74 is retained. The interface 75 includes an AD converter. The interface 75 is connected to the sensors 61 to 66, and supplies the signals from the sensors 61 to 66 to the CPU 71. In addition, the interface 75 transmits drive signals (instruction signals) to the compression ratio control device 27, the actuator 32b for the variable intake timing device 32a, the igniters 36, the injectors 37, and the water pump 53 according to the instruction from the CPU 71.

Next, operation of the control apparatus for the internal combustion engine with the above described configuration will be summarized. The control apparatus determines whether knocking occurs based on a voltage signal Vc output from the knock sensor 62. When knocking occurs, the control apparatus controls the water pump 53 to increase the actual pump rotational speed NPa, by increasing a set pump rotational speed NP. Further, the control apparatus controls the actual mechanical compression ratio to a low mechanical compression ratio that is lower than the mechanical compression ratio set based on the load of the internal combustion engine 10 in a predetermined low compression ratio control period that starts at a time point at which knocking occurs. Thus, the pressure of end gas is decreased, and therefore, occurrence of knocking is suppressed.

Then, the actual pump rotational speed NPa is increased. Accordingly, the flow rate of the coolant discharged from the water pump 53 is increased. This increases cooling efficiency that indicates the magnitude of heat energy transferred to the coolant from the combustion chamber wall surface per unit time. Thus, the temperature of the combustion chamber wall surface is decreased. As a result, the temperature of the end gas is decreased, which suppress occurrence of knocking.

When the low compression ratio control period ends, the control apparatus returns the actual mechanical compression ratio to the mechanical compression ratio set based on the load of the internal combustion engine 10. Thus, with the control apparatus, it is possible to suppress occurrence of knocking, while avoiding the situation where the actual mechanical compression ratio continues to be controlled to the low mechanical compression ratio that is lower than the mechanical compression ratio set based on the load. That is, it is possible to suppress occurrence of knocking, while avoiding inhibition of an increase in the fuel efficiency.

Next, the actual operation of the electric control unit 70 will be described in detail, with reference to FIG. 3 to FIG. 9.

[Setting of Controlled Variables]

Figure 3:
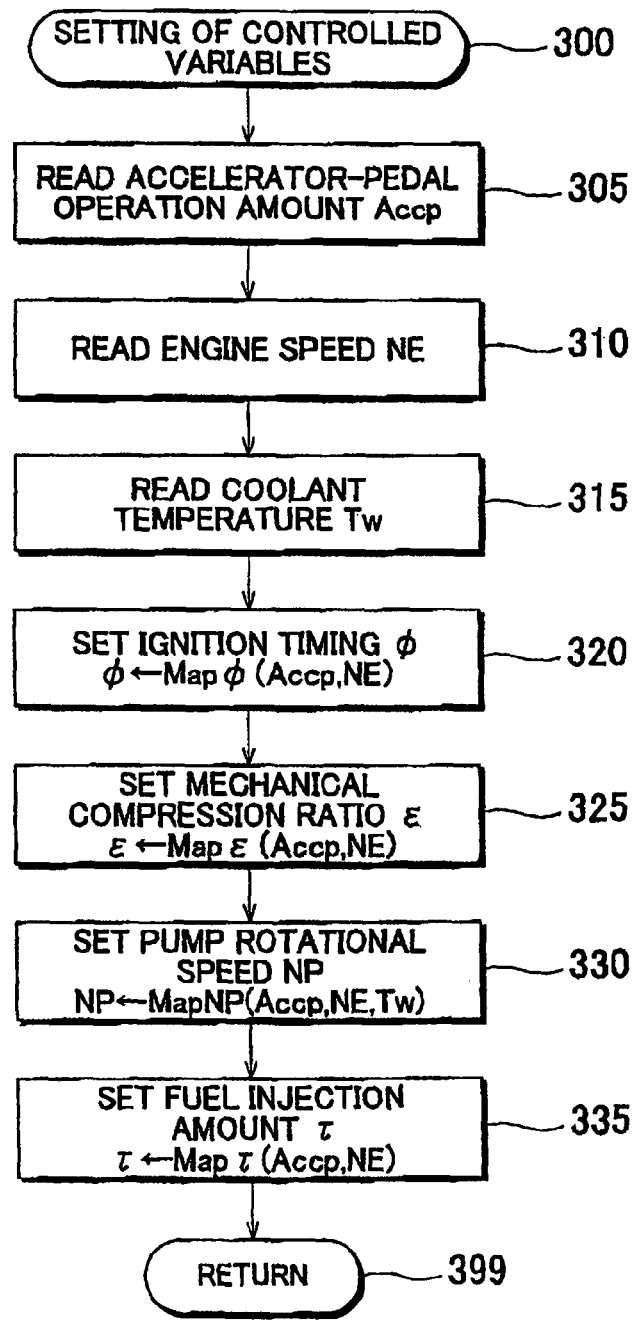
FIG. 3 is a flowchart showing a program that is executed by a CPU shown in FIG. 1 to set controlled variables.

The CPU 71 of the electric control unit 70 executes a controlled variable setting routine shown in the flowchart in FIG. 3, each time the expansion stroke of each cylinder ends (that is, each time the crankshaft 25 is rotated by 180 degrees).

Accordingly, the CPU 71 starts the controlled variable setting routine from step 300 at a predetermined timing. Then, the CPU 71 proceeds to step 305. In step 305, the CPU 71 reads the accelerator-pedal operation amount Accp detected by the accelerator-pedal operation amount sensor 66. Subsequently, in step 310, the CPU 71 reads the engine speed NE detected by the crank position sensor 63. In the embodiment, the accelerator-pedal operation amount Accp indicates the load of the internal combustion engine 10. The load of the internal combustion engine 10 may be indicated by required torque determined based on the accelerator-pedal operation amount Accp and the engine speed NE.

Then, the CPU 71 proceeds to step 315. In step 315, the CPU 71 reads the coolant temperature Tw detected by the coolant temperature sensor 61. Then, the CPU 71 proceeds to step 320. In step 320, the CPU 71 sets an ignition timing $\phi$ ($\phi=\phi1$ in this step), based on a table Map $\phi$ that defines a relation between the accelerator-pedal operation amount Accp/the engine speed NE and the ignition timing $\phi$, the accelerator-pedal operation amount Accp read in step 305, and the engine speed NE read in step 310. Executing the process in step 320 may be regarded as performing a part of the function of the ignition timing control device.

The table Map $\phi$ is set in advance so that the degree of the heat efficiency at the ignition timing $\phi$ set based on the table Map $\phi$ is highest under a given operating condition. The ignition timing $\phi$ is represented in terms of BTDC (before top dead center). The crank angle BTDC (crank angle before top dead center) is defined for each cylinder. The positive value of the crank angle BTDC indicates the rotational angle of the crankshaft 25 (crank angle) with respect to the compression top dead center of each cylinder, in a direction opposite to the rotational direction of the crankshaft 25.

Hereinafter, a table "MapX (a, b)" signifies a table that defines a relation between a variable "a", a variable "b", and a value "X". The phrase "the value X is set based on the table MapX (a, b)" signifies that the value X is set based on the current variable "a" and the current variable "b", and the table MapX (a, b). Only one variable, or three or more variables may be used.

Figure 4:
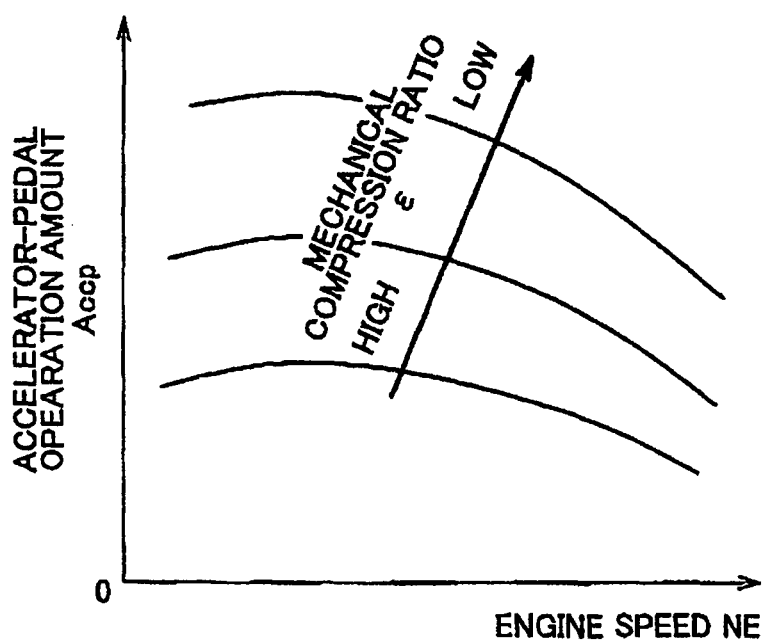
FIG. 4 is a diagram showing a table defining a relation between an engine speed/an accelerator-pedal operation amount and a mechanical compression ratio, to which the CPU shown in FIG. 1 refers.

Then, the CPU 71 proceeds to step 325. In step 325, the CPU 71 sets a mechanical compression ratio $\epsilon$ ($\epsilon=\epsilon1$ in this step), based on a table Map $\epsilon$ (Accp, NE). As shown in FIG. 4, the table Map $\epsilon$ is set in advance so that the mechanical compression ratio $\epsilon$ set based on the table map $\epsilon$ decreases as the accelerator-pedal operation amount Accp increases. Executing the process in step 325 may be regarded as performing a part of the function of the compression ratio control device.

Then, the CPU 71 proceeds to step 330. In step 330, the CPU 71 sets the pump rotational speed NP (NP=NP1 in this step), based on a table MapNP (Accp, NE, Tw). The table MapNP is set in advance so that the pump rotational speed NP set based on the table MapNP increases as the coolant temperature Tw increases, and the pump rotational speed NP set based on the table MapNP increases as the accelerator-pedal operation amount Accp increases.

Then, the CPU 71 proceeds to step 335. In step 335, the CPU 71 sets a fuel injection amount $\tau$ based on a table Map $\tau$ (Accp, NE). The table Map $\tau$ is set in advance so that the fuel injection amount $\tau$ set based on the table Map $\tau$ increases as the accelerator-pedal operation amount Accp increases. Then, the CPU 71 proceeds to step 399. In step 399, the CPU 71 finishes the routine.

Figure 5:
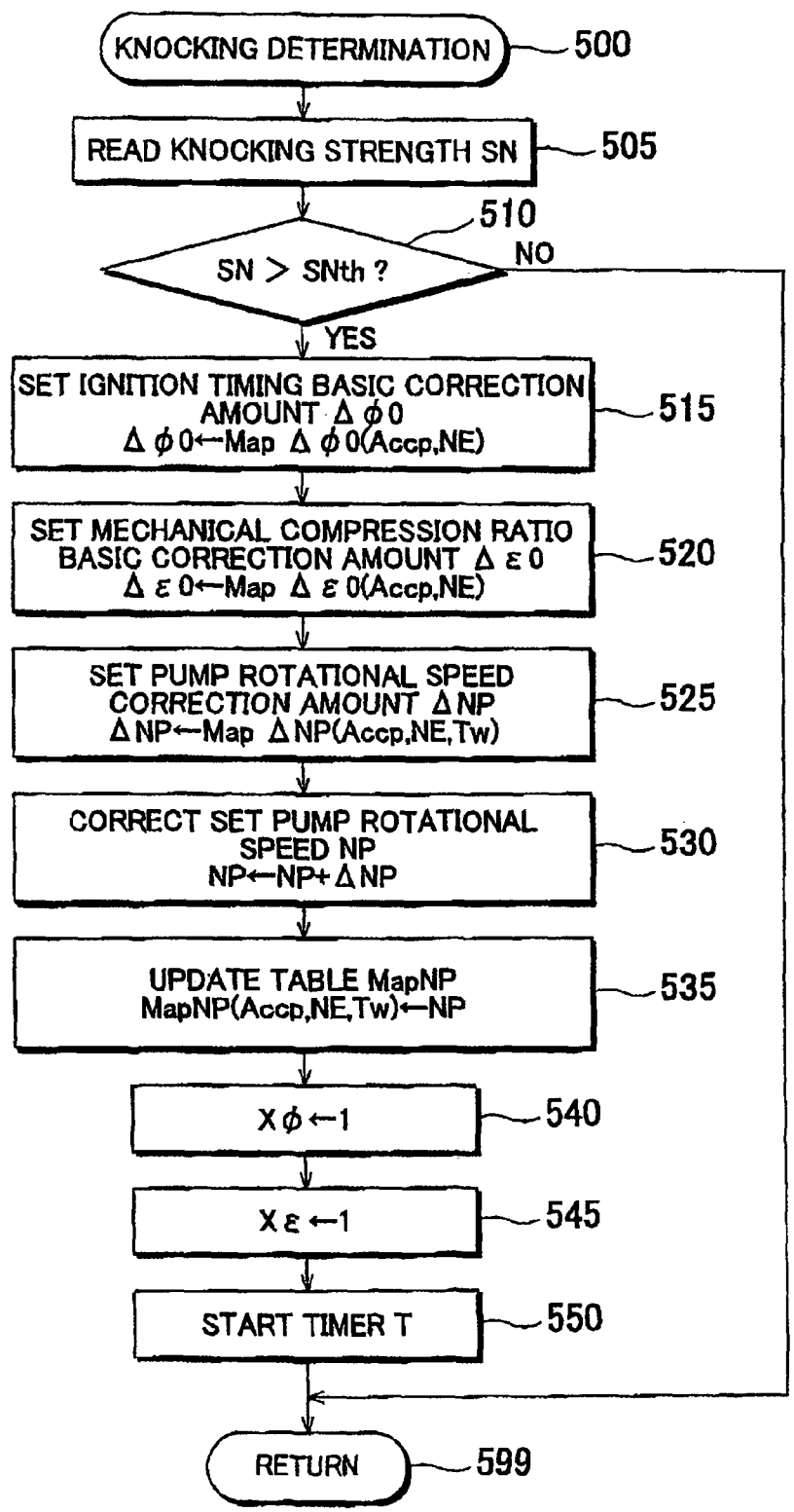
FIG. 5 is a flowchart showing a program that is executed by the CPU shown in FIG. 1 to determine whether knocking occurs.

Further, the CPU 71 executes a knocking determination routine shown by a flowchart in FIG. 5, after the controlled variable setting routine is finished. Executing the routine in FIG. 5 may be regarded as performing a part of the function of the knocking suppression device.

Thus, after the controlled variable setting routine is executed, the CPU 71 starts the knocking determination routine from step 500, and proceeds to step 505. In step 505, the CPU 71 calculates a knocking strength SN based on the vibration Vc of the cylinder block portion 20 detected by the knock sensor 62. In the embodiment, the knocking strength SN is the maximum value of the amplitude of the vibration Vc of the cylinder block portion 20 during a period in which the crankshaft 25 is rotated by 180 degrees (that is, during the expansion stroke of one cylinder). That is, the CPU 71 obtains the index value for each of the plurality of cylinders.

Then, the CPU 71 proceeds to step 510. In step 510, the CPU 71 determines whether the knocking strength SN calculated in step 510 is higher than a threshold strength SNth. The threshold strength SNth is set in advance to a value that is slightly lower than the value of the knocking strength SN when knocking actually occurs. That is, in step 510, it is determined whether the condition that knocking occurs is satisfied. This condition may be referred to as "knocking determination condition" in this specification.

Figure 6:
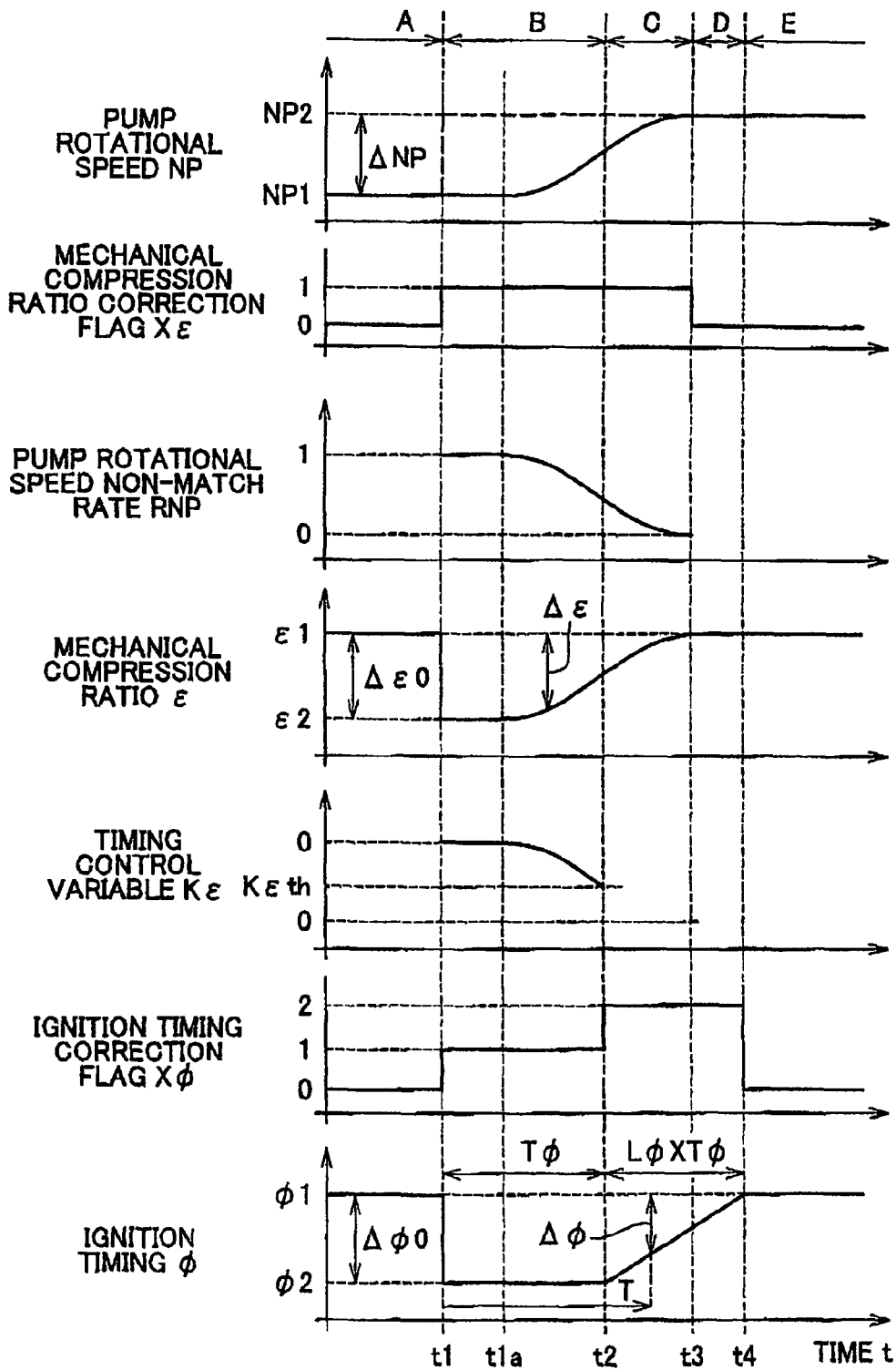
FIG. 6 is a time chart showing changes in a pump rotational speed, a mechanical compression ratio correction flag, a pump rotational speed non-match rate, a mechanical compression ratio, a correction coefficient, an ignition timing correction flag, and an ignition timing.

FIG. 6 shows the case where knocking occurs for some reason at a time point t1. First, processes executed during a period A before the time point t1 in this case will be described.

At this time point during the period A, knocking does not occur, and therefore, the knocking strength SN is lower than the threshold strength SNth. Accordingly, the CPU 71 makes a negative determination in step 510, and proceeds directly to step 599. In step 599, the CPU 71 finishes the routine.

Figure 7:
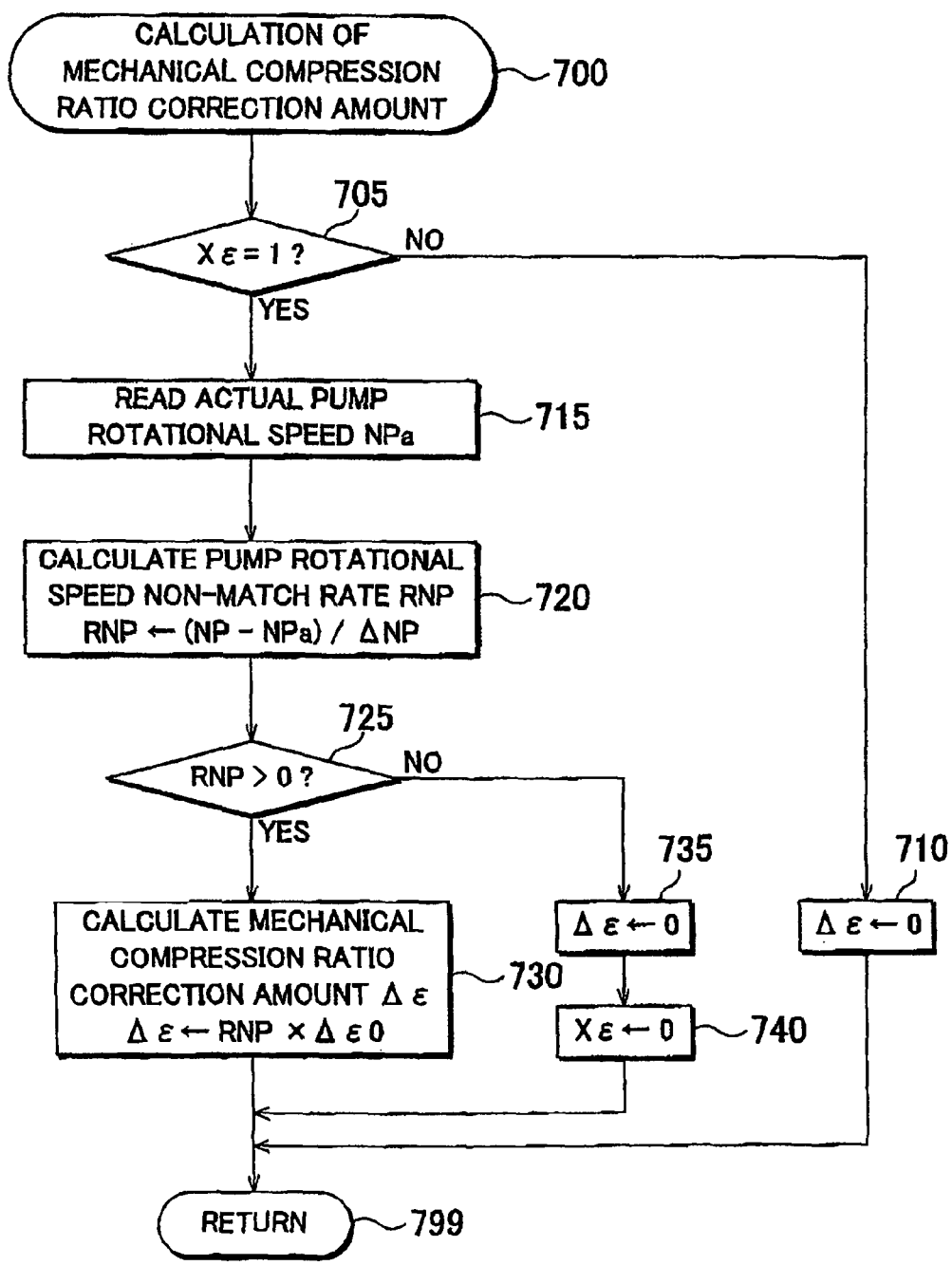
FIG. 7 is a flowchart showing a program that is executed by the CPU shown in FIG. 1 to calculate a mechanical compression ratio correction amount.

In addition, the CPU 71 executes a mechanical compression ratio correction amount calculation routine shown by a flowchart in FIG. 7, after the knocking determination routine is finished. Executing the routine in FIG. 7 may be regarded as performing a part of the function of the knocking suppression device.

Thus, after the knocking determination routine is finished, the CPU 71 starts the mechanical compression ratio correction amount calculation routine from step 700, and proceeds to step 705. In step 705, the CPU 71 determines whether the value of a mechanical compression ratio correction flag Xϵ is "1".

The mechanical compression ratio correction flag Xϵ indicates whether the mechanical compression ratio ϵ set in step 325 needs to be corrected. When the value of mechanical compression ratio correction flag Xϵ is "1", the mechanical compression ratio correction flag Xϵ indicates that the mechanical compression ratio ϵ needs to be corrected. When the value of mechanical compression ratio correction flag Xϵ is "0", the mechanical compression ratio correction flag Xϵ indicates that the mechanical compression ratio ϵ does not need to be corrected. As described later, the value of the mechanical compression ratio correction flag Xϵ is set to "1" when it is determined that knocking occurs (refer to step 545). The value of the mechanical compression ratio correction flag Xϵ is set to "0" when the actual pump rotational speed (i.e., the pump rotational speed detected by the pump rotational speed sensor 65) NPa is equal to the pump rotational speed NP set in step 330 (refer to step 740). Note that when the internal combustion engine 10 is started, the value of the mechanical compression ratio correction flag Xϵ is set to "0".

In this situation, knocking does not occur, and therefore, the value of the mechanical compression ratio correction flag Xϵ remains "0". Accordingly, the CPU 71 makes a negative determination in step 705, and proceeds to step 710. In step 710, the CPU 71 sets a mechanical compression ratio correction amount Δϵ to "0". Then, the CPU 71 proceeds directly to step 799. In step 799, the CPU 71 finishes the routine.

Figure 8:
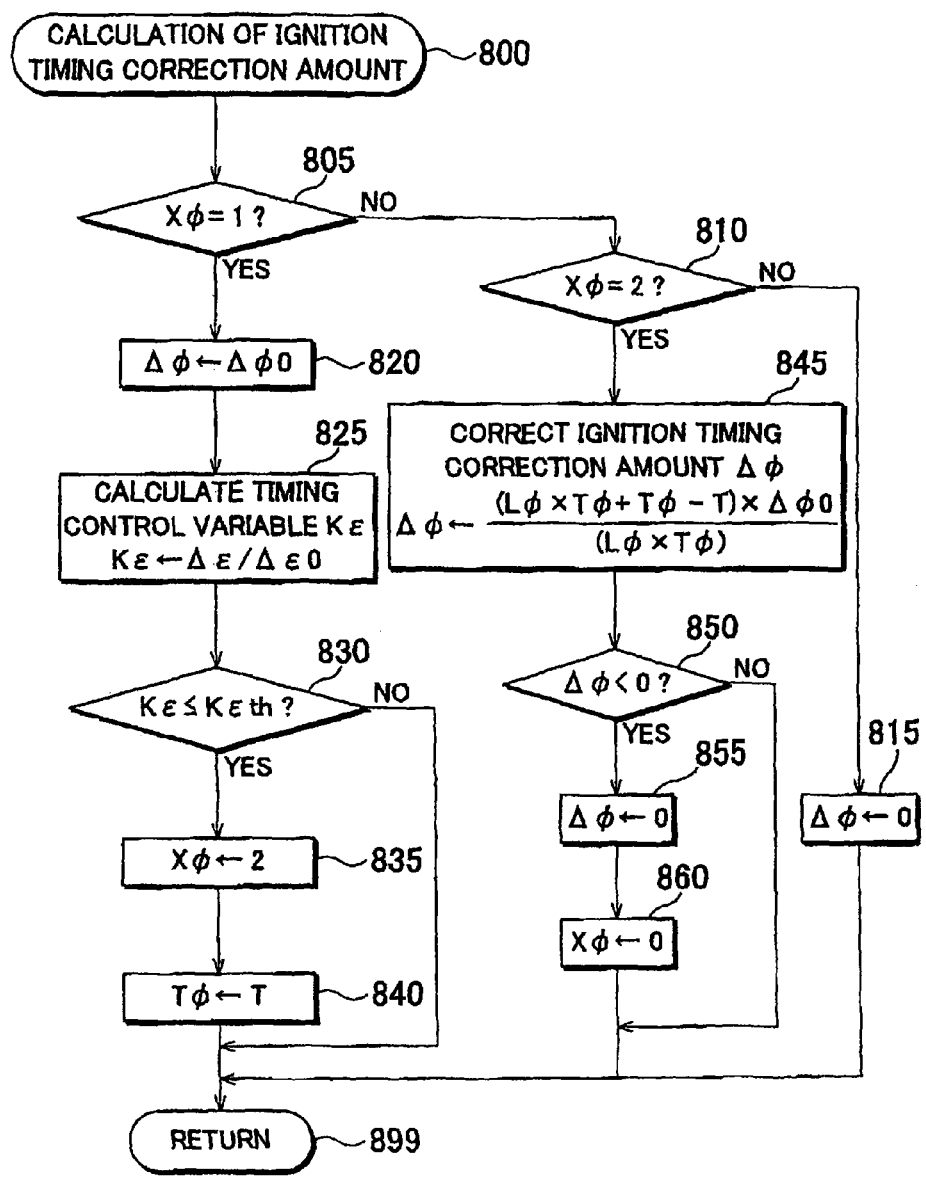
FIG. 8 is a flowchart showing a program that is executed by the CPU shown in FIG. 1 to calculate an ignition timing correction amount.

Further, the CPU 71 executes an ignition timing correction amount calculation routine shown by a flowchart in FIG. 8, after the mechanical compression ratio correction amount calculation routine is finished. Executing the routine in FIG. 8 may be regarded as performing a part of the function of the knocking suppression device.

Thus, after the mechanical compression ratio correction amount calculation routine is finished, the CPU 71 starts the ignition timing correction amount calculation routine from step 800, and proceeds to step 805. In step 805, the CPU 71 determines whether the value of an ignition timing correction flag Xϕ is "1".

The ignition timing correction flag Xϕ indicates whether the ignition timing ϕ set in step 320 needs to be corrected. When the value of the ignition timing correction flag Xϕ is "1" or "2", the ignition timing correction flag Xϕ indicates that the ignition timing ϕ needs to be corrected. When the value of the ignition timing correction flag Xϕ is "0", the ignition timing correction flag Xϕ indicates that the ignition timing ϕ does not need to be corrected. As described later, the value of the ignition timing correction flag Xϕ is set to "1" when it is determined that knocking occurs (refer to step 540). The value of the ignition timing correction flag Xϕ is set to "2" when a timing control variable Kϵ is equal to a predetermined threshold value Kϵth (refer to step 835). The value of the ignition timing correction flag Xϕ is set to "0" when an ignition timing correction amount Δϕ for the ignition timing ϕ is "0" (refer to step 860). Note that the value of the ignition timing correction flag Xϕ is set to "0" when the internal combustion engine 10 is started.

In this situation, knocking does not occur, and therefore, the value of the ignition timing correction flag Xϕ remains "0". Accordingly, the CPU 71 makes a negative determination in step 805, and proceeds to step 810. In step 810, the CPU 71 determines whether the value of the ignition timing correction flag Xϕ is "2". Then, the CPU 71 makes a negative determination in step 810, and proceeds to step 815. In step 815, the CPU 71 sets the value of the ignition timing correction flag Xϕ to "0". Then, the CPU 71 proceeds directly to step 899. In step 899, the CPU 71 finishes the routine.

In addition, the CPU 71 executes a controlled variable correction routine shown by a flowchart in FIG. 9, after the ignition timing correction amount calculation routine is finished. Executing the routine in FIG. 9 may be regarded as performing a part of the function of the knocking suppression device.

Thus, after the ignition timing correction amount calculation routine is finished, the CPU 71 starts the controlled variable correction routine from step 900, and proceeds to step 905. In step 905, the CPU 71 corrects the ignition timing ϕ by setting the ignition timing ϕ to a value ϕ−Δϕ obtained by subtracting the ignition timing correction amount Δϕ (Δϕ=0 at this time point) calculated in the ignition timing correction amount calculation routine in FIG. 8 from the ignition timing ϕ (ϕ=ϕ1 at this time point) set in step 320. However, because the ignition timing correction amount Δϕ is 0 (Δϕ=0) at this time point, the ignition timing ϕ is not actually corrected.

Then, the CPU 71 proceeds to step 910. In step 910, the CPU 71 corrects the mechanical compression ratio ϵ by setting the mechanical compression ratio ϵ to a value ϵ−Δϵ obtained by subtracting the mechanical compression ratio correction amount Δϵ (Δϵ=0 at this time point) calculated in the mechanical compression ratio correction amount calculation routine in FIG. 7 from the mechanical compression ratio ϵ (ϵ=ϵ1 at this time point) set in step 325. However, because the mechanical compression ratio correction amount Δϵ is 0 (Δϵ=0) at this time point, the mechanical compression ratio ϵ is not actually corrected.

Then, the CPU 71 proceeds to step 915. In step 915, the CPU 71 sets a fuel injection amount correction amount Δτ based on the table MapΔτ (Accp, NE, Δφ, Δε). The table MapΔτ is set in advance so that torque output from the internal combustion engine 10 when injecting fuel in an amount obtained by adding the fuel injection amount correction amount Δτ set based on the table MapΔτ to the fuel injection amount τ set in step 335 is equal to torque output from the internal combustion engine 10 when injecting the fuel in the fuel injection amount τ set in step 335 in the case where both of the ignition timing correction amount Δφ and the mechanical compression ratio correction amount Δε are "0". Accordingly, because both of the ignition timing correction amount Δφ and the mechanical compression ratio correction amount Δε are "0" (Δτ=Δε=0) at this time point, the fuel injection amount correction amount Δτ is "0" (Δτ=0).

Then, the CPU 71 proceeds to step 920. In step 920, the CPU 71 corrects the fuel injection amount τ by setting the fuel injection amount τ to a value τ+Δτ obtained by adding the fuel injection amount correction amount Δτ (Δτ=0 at this time point) set in step 915 to the fuel injection amount τ set in step 335. However, because the fuel injection amount correction amount Δτ is 0 (Δτ=0) at this time point, the fuel injection amount τ is not actually corrected. Then, the CPU 71 proceeds to step 999. In step 999, the CPU 71 finishes the routine.

Further, the CPU 71 executes a pump rotational speed control routine (not shown), after the controlled variable correction routine is finished. Thus, after the controlled variable correction routine is finished, the CPU 71 controls the electric power supplied to the water pump 53 by transmitting the drive instruction signal to the water pump 53 to make the actual pump rotational speed NPa equal to the set pump rotational speed NP (NP=NP1 at this time point). Executing the pump rotational speed control routine may be regarded as performing a part of the function of the knocking suppression device.

In addition, the CPU 71 executes a mechanical compression ratio control routine (not shown), after the pump rotational speed control routine is finished. Thus, after the pump rotational speed control routine is finished, the CPU 71 transmits the drive instruction signal to the compression ratio control device 27 to make the actual mechanical compression ratio equal to the mechanical compression ratio ε (ε=ε1 at this time point) set in step 910. Executing the mechanical compression ratio control routine may be regarded as performing a part of the function of the compression ratio control device and a part of the function of the knocking suppression device.

Also, the CPU 71 executes an ignition timing control routine (not shown) for each cylinder independently, each time the crankshaft 25 is rotated by a predetermined small angle. Thus, at a predetermined timing, the CPU 71 determines whether the crank angle in the n cylinder (n=1, 2, 3, or 4) is equal to the ignition timing φ (φ=φ1 at this time point) set in step 905. When the CPU 71 determines that the crank angle in the n cylinder is equal to the ignition timing φ, the CPU 71 transmits the instruction signal to the igniter 36 for the n cylinder so that the igniter 36 for the n cylinder generates a spark. Executing the ignition timing control routine may be regarded as performing a part of the function of the ignition timing control device, and a part of the function of the knocking suppression device.

Further, the CPU 71 executes a fuel injection control routine (not shown) for each cylinder independently, each time the crankshaft 25 is rotated by a predetermined small angle. Thus, at a predetermined timing, the CPU 71 determines whether the crank angle in the n cylinder is equal to a predetermined fuel injection start timing. When the CPU 71 determines that the crank angle in the n cylinder is equal to the predetermined fuel injection start timing, the CPU 71 transmits the instruction signal to the injector 37 for the n cylinder so that the injector 37 for the n cylinder injects the fuel in the fuel injection amount τ corrected in step 920.

Then, knocking occurs at the time point t1. Accordingly, the knocking strength SN becomes higher than the threshold strength SNth. Thus, when the CPU 71 starts the knocking determination routine in FIG. 5 at this time point, and proceeds to step 510, the CPU 71 makes an affirmative determination in step 510, and proceeds to step 515. In the specification, the time point t1 at which it is determined that knocking occurs (that is, the time point t1 at which the knocking determination condition is satisfied) may be referred to as "knocking determination time point".

In step 515, the CPU 71 sets an ignition timing correction basic amount Δφ0 based on a table Map Δφ0 (Accp, NE). The table Map Δφ0 is set in advance so that the value of the ignition timing basic correction amount Δφ0 set based on the table Map Δφ0 is a positive value.

Then, the CPU 71 proceeds to step 520. In step 520, the CPU 71 sets a mechanical compression ratio basic correction amount Δε0 based on a table Map Δε0 (Accp, NE). The table Map Δε0 is set in advance so that the value of the mechanical compression ratio basic correction amount Δε0 based on the table Map Δε0 is a positive value.

Then, the CPU 71 proceeds to step 525. In step 525, the CPU 71 sets a pump rotational speed correction amount ΔNP based on a table Map ΔNP (Accp, NE, Tw). The table Map ΔNP is set in advance so that the value of the pump rotational speed correction amount ΔNP set based on the table Map ΔNP is a positive value.

Then, the CPU 71 proceeds to step 530. In step 530, the CPU 71 corrects the set pump rotational speed NP by setting the pump rotational speed NP to a value NP+ΔNP (the value NP+ΔNP=NP2) obtained by adding the pump rotational speed correction amount ΔNP set in step 525 to the pump rotational speed NP set in step 330.

Then, the CPU 71 proceeds to step 535. In step 535, the CPU 71 updates the table MapNP so that the pump rotational speed NP set based on the accelerator-pedal operation amount Accp, the engine speed NE, and the coolant temperature Tw read in step 305 to step 315, and the table MapNP is equal to the set pump rotational speed NP (=NP2) calculated in step 530.

Then, the CPU 71 proceeds to step 540. In step 540, the CPU 71 sets the value of the ignition timing correction flag Xφ to "1". Subsequently, the CPU 71 sets the value of the mechanical compression ratio correction flag Xε to "1" in step 545. Then, the CPU 71 proceeds to step 550. In step 550, the CPU 71 sets the value of a timer T to "0", thereby starting measurement of an elapsed time after the current time point (i.e., the elapsed time after each of the value of the ignition timing correction flag Xφ and the value of the mechanical compression ratio correction flag Xε is changed from "0" to "1", that is, the elapsed time after it is determined that knocking occurs). Then, the CPU 71 proceeds to step 599. In step 599, the CPU 71 finishes the routine.

In this situation, when the CPU 71 starts the mechanical compression ratio correction amount calculation routine in FIG. 7, and proceeds to step 705, the CPU 71 makes an affirmative determination in step 705, and proceeds to step 715. In step 715, the CPU 71 reads the actual pump rotational speed NPa detected by the pump rotational speed sensor 65 in step 715.

Then, the CPU 71 proceeds to step 720. In step 720, the CPU 71 calculates a value (NP−NPa)/ΔNP as a pump rotational speed non-match rate RNR The value (NP−NPa)/ΔNP is obtained by dividing a value NP−NPa, which is obtained by subtracting the actual pump rotational speed NPa read in step 715 from the pump rotational speed NP (NP=NP2 at this time point) set in step 530, by the pump rotational speed correction amount ΔNP set in step 525. That is, the pump rotational speed non-match rate RNP indicates the degree of the difference between the actual pump rotational speed NPa and the pump rotational speed NP set in step 530. As the value of the pump rotational speed non-match rate RNP approaches "0", the difference decreases.

Then, the CPU 71 proceeds to step 725. In step 725, the CPU 71 determines whether the value of the pump rotational speed non-match rate RNP calculated in step 720 is a positive value. Because the value NP−NPa is equal to the pump rotational speed correction amount ΔNP at this time point, the pump rotational speed non-match rate RNP is "1".

Accordingly, the CPU 71 makes an affirmative determination in step 725, and proceeds to step 730. In step 730, the CPU 71 calculates a value RNP×Δε0 as a mechanical compression ratio correction amount Δε (Δε=Δε0 at this time point). The value RNP×Δε0 is obtained by multiplying the mechanical compression ratio basic correction amount Δε0 set in step 520 by the pump rotational speed non-match rate RNP calculated in step 720. Then, the CPU 71 proceeds to step 799. In step 799, the CPU 71 finishes the routine.

In addition, when the CPU 71 starts the ignition timing correction amount calculation routine in FIG. 8, and proceeds to step 805, the CPU 71 makes an affirmative determination in step 805, and proceeds to step 820.

In step 820, the CPU 71 sets the ignition timing correction amount Δφ to the ignition timing basic correction amount Δφ0 set in step 515. Then, the CPU 71 proceeds to step 825. In step 825, the CPU 71 calculates a value Δε/Δε0 as the timing control variable Kε (Kε=1 at this time point). The value Δε/Δε0 is obtained by dividing the mechanical compression ratio correction amount Δε calculated in the mechanical compression ratio correction amount calculation routine in FIG. 7 by the mechanical compression ratio basic correction amount Δε0 set in step 520.

In the embodiment, the timing control variable Kε is equal to the pump rotational speed non-match rate RNP (Kε=Δε/Δε0=RNP×Δε0/Δε0 =RNP). Accordingly, as the actual pump rotational speed NPa approaches the pump rotational speed NP (NP=NP2 at this time point) set in step 330 or step 530, the pump rotational speed non-match rate RNP decreases, and therefore, the timing control variable Kε decreases.

Then, the CPU 71 proceeds to step 830. In step 830, the CPU 71 determines whether the timing control variable Kε calculated in step 825 is equal to or below a predetermined threshold value Kεth (0.4 in the embodiment).

At this time point, the mechanical compression ratio correction amount Δε is equal to the mechanical compression ratio basic correction amount Δε0, and therefore, the timing control variable Kε is "1". Accordingly, the CPU 71 makes a negative determination in step 830, and proceeds directly to step 899. In step 899, the CPU 71 finishes the routine.

In addition, the CPU 71 executes the controlled variable correction routine in FIG. 9, the mechanical compression ratio control routine, and the ignition timing control routine. As a result, the actual ignition timing is controlled to an ignition timing φ2 that is more retarded than the ignition timing φ1 set based on the load of the internal combustion engine 10 by the ignition timing basic correction amount Δφ0 (refer to step 515 and step 820). Further, the actual mechanical compression ratio is controlled to a mechanical compression ratio ε2 that is lower than the mechanical compression ratio ε1 set based on the load of the internal combustion engine 10 by the mechanical compression ratio basic correction amount Δε0 (refer to step 520 and step 720 to step 730).

This situation is maintained as long as the timing control variable Kε is above the threshold value Kεth. In this situation, the actual pump rotational speed NPa is gradually increased toward the set pump rotational speed NP (=NP2) as time elapses. This increases the flow rate of the coolant. As a result, the cooling efficiency is increased, and therefore, the temperature of the combustion chamber wall surface is decreased.

Further, the processes in step 720 and 730 are repeatedly executed. Thus, as the actual pump rotational speed NPa approaches the set pump rotational speed NP (=NP2), the pump rotational speed non-match rate RNP decreases, and as a result, the mechanical compression ratio correction amount Δε is decreased. In other words, as the actual pump rotational speed NPa approaches the set pump rotational speed NP (=NP2), the mechanical compression ratio ε is increased toward the mechanical compression ratio ε1 set based on the load of the internal combustion engine 10.

As the actual pump rotational speed NPa is increased, the cooling efficiency is increased. Accordingly, as the actual pump rotational speed NPa is increased, the possibility of occurrence of knocking is reduced. Thus, by increasing the mechanical compression ratio ε as the actual pump rotational speed NPa is increased, it is possible to increase the fuel efficiency as much as possible, while suppressing occurrence of knocking.

In contrast, the ignition timing correction amount Δφ is maintained at the ignition timing basic correction amount Δφ0. That is, the actual ignition timing continues to be controlled to the ignition timing φ2 that is more retarded than the ignition timing φ1 set based on the load of the internal combustion engine 10 by the ignition timing basic correction amount Δφ0.

At this time, the mechanical compression ratio ε approaches the mechanical compression ratio ε1 set based on the load of the internal combustion engine 10, and therefore, the timing control variable Kε decreases.

At a time point t2, the timing control variable Kε is equal to the threshold value Kεth. Accordingly, when the CPU 71 starts the ignition timing correction amount calculation routine in FIG. 8 at the time point t2, and proceeds to step 830, the CPU 71 makes an affirmative determination in step 830, and proceeds to step 835. In step 835, the CPU 71 sets the value of the ignition timing correction flag Xφ to "2".

Then, the CPU 71 proceeds to step 840. In step 840, the CPU 71 sets an ignition timing maintenance period Tφ to the value of the timer T at the current time point. That is, the ignition timing maintenance period Tφ indicates a period during which the actual ignition timing has been maintained at the ignition timing φ2 that is more retarded than the ignition timing φ1 set based on the load of the internal combustion engine 10 by the ignition timing basic correction amount Δφ0. Then the CPU 71 proceeds to step 899. In step 899, the CPU 71 finishes the routine.

Then, after the CPU 71 starts the ignition timing correction amount calculation routine in FIG. 8 again when the crankshaft 25 is rotated by 180 degrees, the CPU 71 makes a negative determination in step 805, and proceeds to step 810.

Then, the CPU 71 determines that the value of the ignition timing correction flag Xφ is "2", that is, makes an affirmative determination in step 810, and proceeds to step 845. In step 845, the CPU 71 calculates the ignition timing correction amount Δφ according to the equation (1) described below.

$$\Delta\phi = (L\phi \times T\phi + T\phi - T) \times \Delta\phi 0 / (L\phi \times T\phi) \quad (1)$$

In this equation, Lφ is a predetermined coefficient (0.9 in the embodiment). The coefficient Lφ is set in advance so that the actual pump rotational speed NPa is equal to the set pump rotational speed NP (=NP2) before a period (Tφ+Lφ×Tφ) elapses after the time point t1. As shown in FIG. 6, the ignition timing correction amount Δφ calculated according to the equation (1) is decreased in proportion to the elapsed time. The ignition timing correction amount Δφ is changed from the ignition timing basic correction amount Δφ0 to "0" over a period Lφ×Tφ obtained by multiplying the ignition timing maintenance period Tφ by the coefficient Lφ.

Then, the CPU 71 proceeds to step 850. In step 850, the CPU 71 determines whether the value of the ignition timing correction amount Δφ is a negative value. At this time point, the value of the ignition timing correction amount Δφ is a positive value. Therefore, the CPU 71 makes a negative determination in step 850, and proceeds directly to step 899. In step 899, the CPU 71 finishes the routine.

Thus, the ignition timing correction amount Δφ continues to be decreased until the ignition timing correction amount Δφ becomes "0". Thus, because the ignition timing correction amount Δφ is decreased as time elapses, the actual ignition timing is gradually advanced toward the ignition timing φ1 set based on the load of the internal combustion engine 10, as time elapses.

Then, at a time point t3, the actual pump rotational speed NPa becomes equal to the pump rotational speed NP (=NP2) set in step 330. That is, the pump rotational speed non-match rate RNP becomes "0". Accordingly, when the CPU 71 starts the mechanical compression ratio correction amount calculation routine in FIG. 7 at the time point t3, and proceeds to step 725, the CPU 71 makes a negative determination in step 725, and proceeds to step 735.

In step 735, the CPU 71 sets the mechanical compression ratio correction amount Δε to "0". Subsequently, the CPU 71 sets the value of the mechanical compression ratio correction flag Xε to "0" in step 740. Then, the CPU 71 proceeds to step 799. In step 799, the CPU 71 finishes the routine.

Then, after the CPU 71 starts the mechanical compression ratio correction amount calculation routine in FIG. 7 again when the crankshaft 25 is rotated by 180 degrees, the CPU 71 makes a negative determination in step 705, and proceeds to step 710. In step 710, the CPU 71 sets the mechanical compression ratio correction amount Δε to "0". Subsequently, the CPU 71 finishes the routine in step 799. Thus, the mechanical compression ratio correction amount Δε continues to be set to "0" until knocking occurs again.

At a time point t4 later than the time point t2 by the period Lφ×Tφ, the ignition timing correction amount Δφ becomes "0". Thus, after the CPU 71 starts the ignition timing correction amount calculation routine in FIG. 8 at the time point t4, the CPU 71 makes an affirmative determination in step 850, and proceeds to step 855. In step 855, the CPU 71 sets the ignition timing correction amount Δφ to "0". Subsequently, the CPU 71 sets the value of the ignition timing correction flag Xφ to "0" in step 860. Then, the CPU 71 proceeds to step 899, and finishes the routine.

Then, after the CPU 71 starts the ignition timing correction amount calculation routine in FIG. 8 again when the crankshaft 25 is rotated by 180 degrees, the CPU 71 makes a negative determination in step 805, and makes a negative determination in step 810. Thus, the CPU 71 proceeds to step 815. In step 815, the CPU 71 sets the ignition timing correction amount Δφ to "0". Subsequently, the CPU 71 finishes the routine in step 899. Thus, the ignition timing correction amount Δφ continues to be set to "0" until knocking occurs again.

Thus, when it is determined that knocking occurs, the water pump 53 is controlled by increasing the set pump rotational speed NP, at the time point t1 at which it is determined that knocking occurs (i.e., at the knocking determination time point t1). Further, the actual mechanical compression ratio is controlled to the low mechanical compression ratio that is lower than the mechanical compression ratio ε1 set based on the load of the internal combustion engine 10, during a period from the knocking determination time point t1 to the time point t3 at which the actual pump rotational speed NPa becomes equal to the pump rotational speed NP2 that is higher than the pump rotational speed NP1 set before knocking occurs (i.e., during a period B and a period C in FIG. 6). Thus, the pressure of the end gas is decreased, and therefore, occurrence of knocking is suppressed. The period obtained by combining the period B with the period C may be referred to as "low compression ratio control period".

Then, the actual pump rotational speed NPa is increased. This increases the flow rate of the coolant discharged from the water pump 53. Thus, the cooling efficiency is increased. Accordingly, the temperature of the wall surface constituting the combustion chamber CC (i.e., the combustion chamber wall surface that includes, for example, the bore wall surface and the lower surface of the cylinder head portion 30) is decreased. As a result, the temperature of the end gas is decreased. This suppresses occurrence of knocking.

During a period after the time point t3 (i.e., during a period D and period E in FIG. 6), the actual mechanical compression ratio is returned to the mechanical compression ratio ε1 set based on the load of the internal combustion engine 10. Thus, it is possible to suppress occurrence of knocking, while avoiding the situation where the actual mechanical compression ratio continues to be controlled to the low mechanical compression ratio that is lower than the mechanical compression ratio ε1 set based on the load. That is, it is possible to suppress occurrence of knocking, while avoiding inhibition of an increase in the fuel efficiency.

In addition, the actual ignition timing is controlled to the ignition timing that is more retarded than the ignition timing φ set based on the load of the internal combustion engine 10 (i.e., the retarded ignition timing), during a period from the knocking determination time point t1 to the time point t4 (i.e., during the period B, the period C, and the period D in FIG. 6). The period obtained by combining the period B, the period C, and the period D together in FIG. 6 may be referred to as "ignition timing retarding control period".

Thus, the pressure of the end gas is decreased, and therefore, occurrence of knocking is suppressed. As a result, it is possible to suppress occurrence of knocking even if the internal combustion engine 10 is operated when the actual mechanical compression ratio is higher than the set mechanical compression ratio during a period immediately after the knocking determination time point t1, because the actual mechanical compression ratio is changed after a control delay time elapses.

More specifically, the actual ignition timing is maintained at a constant ignition timing (first retarded ignition timing) φ2 that is more retarded than the ignition timing φ1 set based on the load of the internal combustion engine 10 by the ignition timing basic correction amount Δφ0, during a period from the knocking determination time point t1 to the time point t2 at which the timing control variable Kε becomes equal to the threshold value Kεth after the timing control variable Kε is decreased (i.e., during the period B in FIG. 6). The timing control variable Kε is not decreased until a time point t1a at which the pump rotational speed non-match rate RNP starts to decrease. Thus, the time point t2 is later than the time point t1a at which the actual mechanical compression ratio starts to be increased. The time point t2 may be referred to as "second time point" in this specification.

Thus, it is possible to suppress occurrence of knocking even when the actual mechanical compression ratio quickly approaches the mechanical compression ratio $\epsilon 1$ set based on the load of the internal combustion engine 10. That is, it is possible to more quickly make the actual mechanical compression ratio approach the mechanical compression ratio $\epsilon 1$ set based on the load of the internal combustion engine 10, while suppressing occurrence of knocking. This increases the fuel efficiency.

Then, the actual ignition timing is gradually advanced from the ignition timing $\phi 2$ toward the ignition timing $\phi 1$ during a period after the time point t2 (i.e., during the period C and the period D in FIG. 6). That is, during the period obtained by combining the period C with the period D, the actual ignition timing is controlled to a second retarded ignition timing that is more advanced than the first retarded ignition timing $\phi 2$. Thus, the fuel efficiency is increased, as compared to the case where the actual ignition timing is controlled to the first retarded ignition timing $\phi 2$ during this period as well.

Also, because the threshold value K$\epsilon$th is set to a sufficiently low value, and the coefficient L$\phi$ is set to a sufficiently high value, a period from the time point t2 to the time point at which the actual pump rotational speed NPa becomes equal to the set pump rotational speed NP2 (i.e., the length of the period C in FIG. 6) is shorter than the period L$\phi$×T$\phi$ (i.e., the length of the period obtained by combining the period C with the period D in FIG. 6). Accordingly, after the low compression ratio control period ends, the ignition timing retarding control period ends.

That is, during the period in which the actual mechanical compression ratio is controlled to the low mechanical compression ratio, the actual ignition timing is controlled to the retarded ignition timing. This reduces the possibility of occurrence of knocking. Accordingly, it is possible to avoid occurrence of knocking even when the actual mechanical compression ratio quickly approaches the mechanical compression ratio $\epsilon 1$ set based on the load of the internal combustion engine 10. That is, it is possible to quickly make the actual mechanical compression ratio approach the mechanical compression ratio $\epsilon 1$ set based on the load of the internal combustion engine 10, while suppressing occurrence of knocking. This increases the fuel efficiency.

As described above, with the control apparatus for the internal combustion engine according to the first embodiment of the invention, it is possible to suppress occurrence of knocking, while avoiding inhibition of an increase in the fuel efficiency.

Next, a control apparatus for an internal combustion engine according to a modified example of the first embodiment of the invention will be described. The control apparatus according to the modified example differs from the control apparatus according to the first embodiment, only in that when knocking occurs, the control apparatus according to the modified example executes a control so that the cooling efficiency for at least one cylinder in which knocking occurs is higher than the cooling efficiency for at least one cylinder in which knocking does not occur. Thus, hereinafter, the control apparatus according to the modified example will be described with a focus on the difference.

Figure 10A:
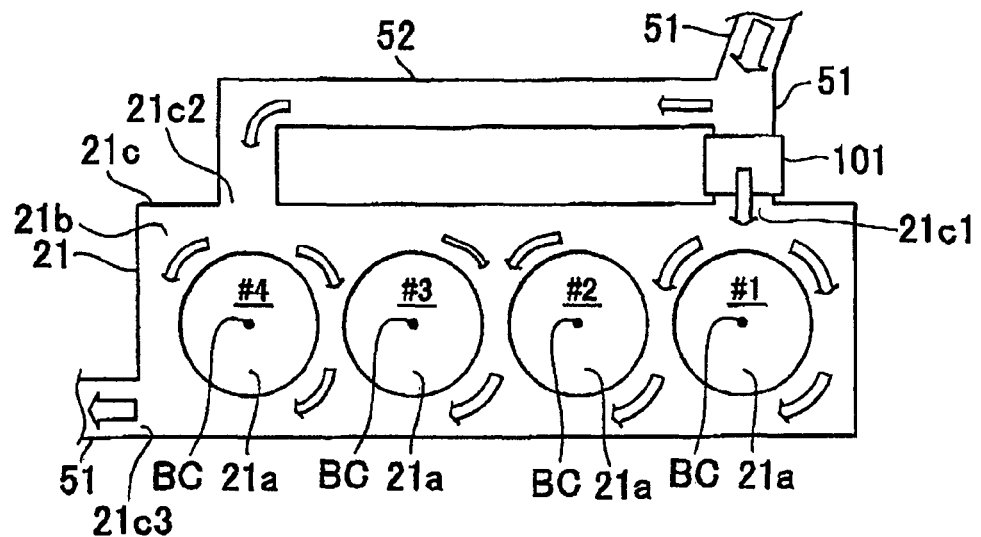
FIGS. 10A and 10B are enlarged cross sectional views, each of which shows a portion of a cooling system, where a branch pipe is connected to a circulation pipe, according to a modified example of the first embodiment of the invention.
Figure 10B:
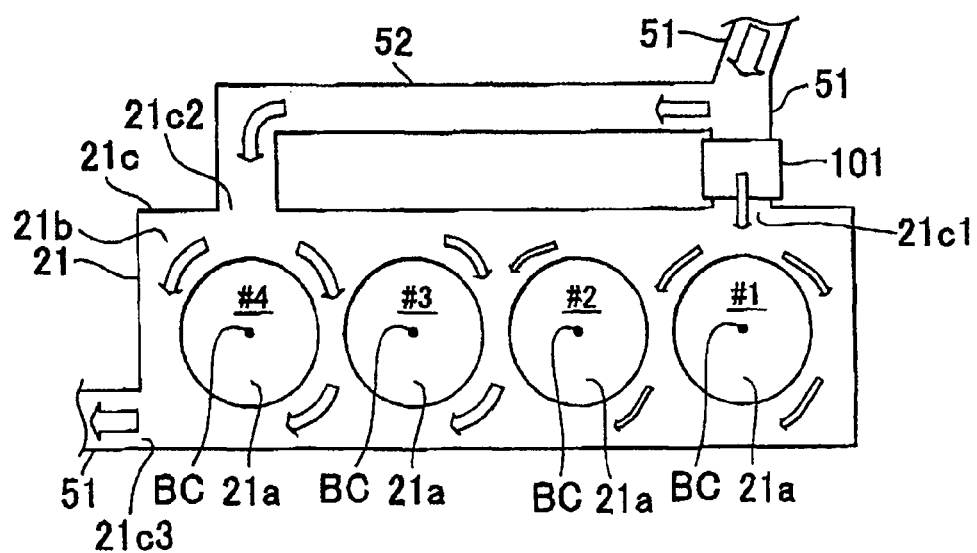

As shown in FIG. 10A and FIG. 10B, the internal combustion engine 10 according to the modified example includes a branch flow rate regulating valve 101 that constitutes a part of the cooling device. The branch flow rate regulating valve 101 is disposed at a position close to, and downstream of the position at which the branch pipe 52 is connected to the circulation pipe 51 in the direction in which the coolant flows toward the cylinder block 21.

As shown in FIG. 11A and FIG. 11B, the branch flow rate regulating valve 101 includes a valve element 101a, a spring 101b, and a solenoid coil 101c. The valve element 101a is movable in a predetermined drive direction (that includes a direction shown by the arrow DW in FIG. 11A (a valve-closing direction in which the valve element 101a is moved to close the branch flow rate regulating valve 101), and a direction shown by the arrow UW in FIG. 11B (a valve-opening direction in which the valve element 101a is moved to open the branch flow rate regulating valve 101)). As the valve element 101a moves in the valve-closing direction, the cross sectional area of the circulation pipe 51 at the position where the branch flow rate regulating valve 101 is disposed is decreased.

The spring 101b applies a predetermined pressing force to the valve element 101a in the valve-opening direction UW. The solenoid coil 101c generates power (driving power) that moves the valve element 101a in the valve-closing direction DW, and that varies depending on the amount of electric power supplied to the solenoid coil 101c.

With the configuration, by changing the amount of electric power supplied to the solenoid coil 101c, the position of the valve element 101a in the drive direction is changed. That is, as the amount of electric power supplied to the solenoid coil 101c is increased, the flow rate of the coolant flowing toward the opening portion 21c2 is increased, and the flow rate of the coolant flowing toward the opening portion 21c1 is decreased.

The relation between the position of the valve element 101a and the cooling efficiency will be described. Hereinafter, for the sake of convenience, the cylinders will be referred to as a first cylinder #1, a second cylinder #2, a third cylinder #3, and a fourth cylinder #4 in a direction from the opening portion 21c1 to the opening portion 21c2.

First, the case where the valve element 101a is located at a position reached after the valve element 101a is moved from an intermediate position in the movable range in the valve-opening direction UW will be described. In this case, as shown in FIG. 11A, the cross sectional area of the circulation pipe 51 at the position where the branch flow rate regulating valve 101 is disposed is relatively large. Accordingly, as shown in FIG. 10A, the flow rate of the coolant supplied to the cylinder block 21 through the opening portion 21c1 is higher than the flow rate of the coolant supplied to the cylinder block 21 through the branch pipe 52 and the opening portion 21c2. Note that the width of the outline arrow increases, the flow rate of the coolant increases in FIG. 10A and FIG. 10B.

Thus, the flow rate of the coolant flowing around the first cylinder #1 and the second cylinder #2 is higher than the flow rate of the coolant flowing around the third cylinder #3 and the fourth cylinder #4. Therefore, the cooling efficiency for the first cylinder #1 and the second cylinder #2 is higher than the cooling efficiency for the third cylinder #3 and the fourth cylinder #4.

Next, the case where the valve element 101a is located at a position reached after the valve element 101a is moved from the intermediate position in the movable range in the valve-closing direction DW will be described. In this case, as shown in FIG. 11B, the cross sectional area of the circulation pipe 51 at the position where the branch flow rate regulating valve 101 is disposed is relatively small. Accordingly, as shown in FIG. 10B, the flow rate of the coolant supplied to the cylinder block 21 through the opening portion 21c1 is lower than the flow rate of the coolant supplied to the cylinder block 21 through the branch pipe 52 and the opening portion 21$c$2.

Thus, the flow rate of the coolant flowing around the first cylinder #1 and the second cylinder #2 is lower than the flow rate of the coolant flowing around the third cylinder #3 and the fourth cylinder #4. Therefore, the cooling efficiency for the first cylinder #1 and the second cylinder #2 is lower than the cooling efficiency for the third cylinder #3 and the fourth cylinder #4.

Thus, by changing the amount of electric power supplied to the solenoid coil 101$c$, the cooling efficiency for the first cylinder #1 and the second cylinder #2, and the cooling efficiency for the third cylinder #3 and the fourth cylinder #4 are adjusted.

Figure 12:
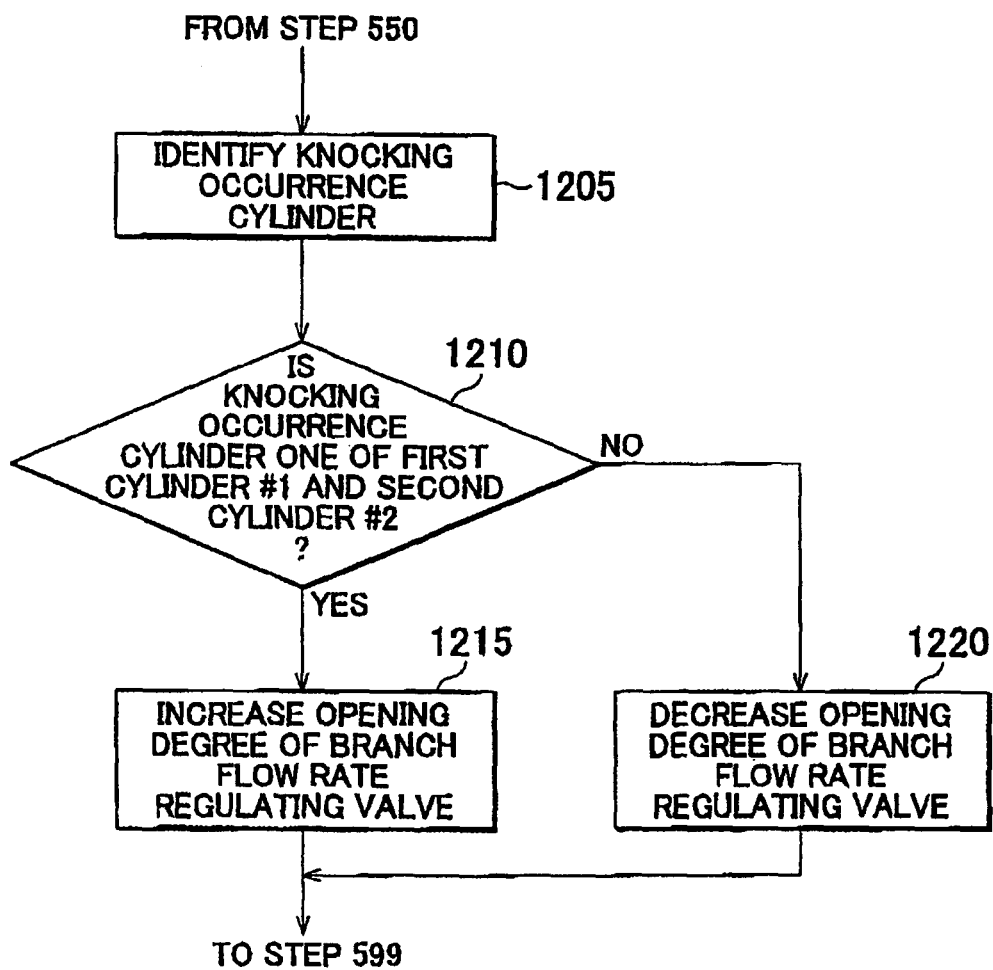
FIG. 12 is a flowchart showing processes that are executed by the CPU to control an opening degree of a branch flow rate regulating valve according to the modified example of the first embodiment of the invention, in addition to the program shown in FIG. 5.

Further, the CPU 71 executes a knocking determination routine in which step 1205 to step 1220 shown by a flowchart in FIG. 12 are added between step 550 and step 599 in the knocking determination routine in FIG. 5 according to the first embodiment, instead of executing the knocking determination routine in FIG. 5. Executing step 1205 to step 1220 may be regarded as performing a part of the function of the knocking suppression device.

First, the case where knocking occurs in the first cylinder #1 will be described. In this case, when the CPU 71 starts the knocking determination routine, and proceeds to step 510, the CPU 71 makes an affirmative determination in step 510, and proceeds to step 515 and subsequent steps. In step 515 and subsequent steps, the CPU 71 sets the ignition timing basic correction amount $\Delta\phi$, the mechanical compression ratio basic correction amount $\Delta\epsilon 0$, and the pump rotational speed correction amount $\Delta NP$, and corrects the set pump rotational speed NP.

Then, the CPU 71 proceeds to step 1205. In step 1205, the CPU 71 identifies a cylinder in which the expansion stroke ends at the current time point, as a knocking occurrence cylinder in which knocking occurs (the first cylinder #1 in this case), based on the rotational angle of the crankshaft 25 at the current time point. That is, the knocking occurrence cylinder is a cylinder in which the knocking determination condition is satisfied.

Then, the CPU 71 proceeds to step 1210. In step 1210, the CPU 71 determines whether the knocking occurrence cylinder is one of the first cylinder #1 and the second cylinder #2. In this situation, the CPU 71 has identified the first cylinder #1 as the knocking occurrence cylinder. Therefore, the CPU 71 makes an affirmative determination in step 1210, and proceeds to step 1215.

In step 1215, the CPU 71 executes a control (an opening degree increase control) that increases the opening degree of the branch flow rate regulating valve 101. That is, the CPU 71 transmits the instruction signal to the branch flow rate regulating valve 101 to decrease the amount of electric power supplied to the solenoid coil 101$c$. Then, the CPU 71 proceeds to step 599. In step 599, the CPU 71 finishes the routine.

Thus, the driving power generated by the solenoid coil 101$c$ is decreased. Therefore, the valve element 101$a$ of the branch flow rate regulating valve 101 is moved in the valve-opening direction UW. As a result, the cross sectional area of the circulation pipe 51 at the position where the branch flow rate regulating valve 101 is disposed is increased. Accordingly, the flow rate of the coolant supplied to the cylinder block 21 through the opening portion 21$c$1 is increased. In contrast, the flow rate of the coolant supplied to the cylinder block 21 through the branch pipe 52 and the opening portion 21$c$2 is decreased.

Further, as described above, as the actual pump rotational speed NPa is increased, the total flow rate of the coolant supplied to the cylinder block 21 is increased. Accordingly, the flow rate of the coolant flowing around the first cylinder #1 and the second cylinder #2 is increased by a value larger than a value by which the flow rate of the coolant flowing around the third cylinder #3 and the fourth cylinder #4 is increased, as compared to a time point before knocking occurs. As a result, the cooling efficiency for the first cylinder #1 and the second cylinder #2 is higher than the cooling efficiency for the third cylinder #3 and the fourth cylinder #4.

Thus, it is possible to more reliably suppress occurrence of knocking in the first cylinder #1 and the second cylinder #2. That is, it is possible to reduce the possibility of reoccurrence of knocking in the first cylinder #1 in which knocking has occurred. In the case where knocking occurs in the second cylinder #2 as well, the above-described control is executed.

Next, the case where knocking occurs in the fourth cylinder #4 will be described. In this case, after the CPU 71 starts the knocking determination routine, the CPU 71 makes a negative determination in step 1210, and proceeds to step 1220.

The CPU 71 executes a control (opening degree decrease control) that decreases the opening degree of the branch flow rate regulating valve 101. That is, the CPU 71 transmits the instruction signal to the branch flow rate regulating valve 101 to increase the amount of electric power supplied to the solenoid coil 101$c$. Then, the CPU 71 proceeds to step 599. In step 599, the CPU 71 finishes the routine.

Thus, the driving power generated by the solenoid coil 101$c$ is increased, and therefore, the valve element 101$a$ of the branch flow rate regulating valve 101 is moved in the valve-closing direction DW. As a result, the cross sectional area of the circulation pipe 51 at the position where the branch flow rate regulating valve 101 is disposed is decreased. Accordingly, the flow rate of the coolant supplied to the cylinder block 21 through the opening portion 21$c$1 is decreased. In contrast, the flow rate of the coolant supplied to the cylinder block 21 through the branch pipe 52 and the opening portion 21$c$2 is increased.

Further, as described above, as the actual pump rotational speed NPa is increased, the total flow rate of the coolant supplied to the cylinder block 21 is increased. Accordingly, the flow rate of the coolant flowing around the third cylinder #3 and the fourth cylinder #4 is increased by a value larger than a value by which the flow rate of the coolant flowing around the first cylinder #1 and the second cylinder #2 is increased, as compared to a time point before knocking occurs. As a result, the cooling efficiency for the third cylinder #3 and the fourth cylinder #4 is higher than the cooling efficiency for the first cylinder 41 and the second cylinder #2.

Thus, it is possible to more reliably suppress occurrence of knocking in the third cylinder #3 and the fourth cylinder #4. That is, it is possible to reduce the possibility of reoccurrence of knocking in the fourth cylinder #4 in which knocking has occurred. In the case where knocking occurs in the third cylinder #3 as well, the above-described control is executed.

As described above, with the control apparatus for the internal combustion engine according to the modified example of the first embodiment of the invention, when knocking occurs in at least one cylinder among the cylinders, the cooling efficiency for the at least one cylinder in which knocking occurs is made higher than the cooling efficiency for at least one cylinder in which knocking does not occurs. Thus, it is possible to reduce the possibility of reoccurrence of knocking in the cylinder in which knocking has occurred. In other words, because the possibility of occurrence of knocking in each cylinder is made substantially the same, it is possible to avoid the situation where the mechanical compression ratio of the entire engine cannot be increased due to at least one cylinder in which knocking is likely to occur.

Next, a control apparatus for an internal combustion engine according to a second embodiment of the invention will be described. The control apparatus according to the first embodiment controls the actual mechanical compression ratio to the mechanical compression ratio ϵ corresponding to the actual pump rotational speed NPa, in the low compression ratio control period. The control apparatus according to the second embodiment differs from the control apparatus according to the first embodiment, only in that the control apparatus according to the second embodiment maintains the actual mechanical compression ratio at a constant value during a period until the actual pump rotational speed NPa becomes equal to a predetermined threshold rotational speed, and the actual mechanical compression ratio is gradually increased as time elapses after the period elapses, in the low mechanical compression ratio control period.

Figure 13:
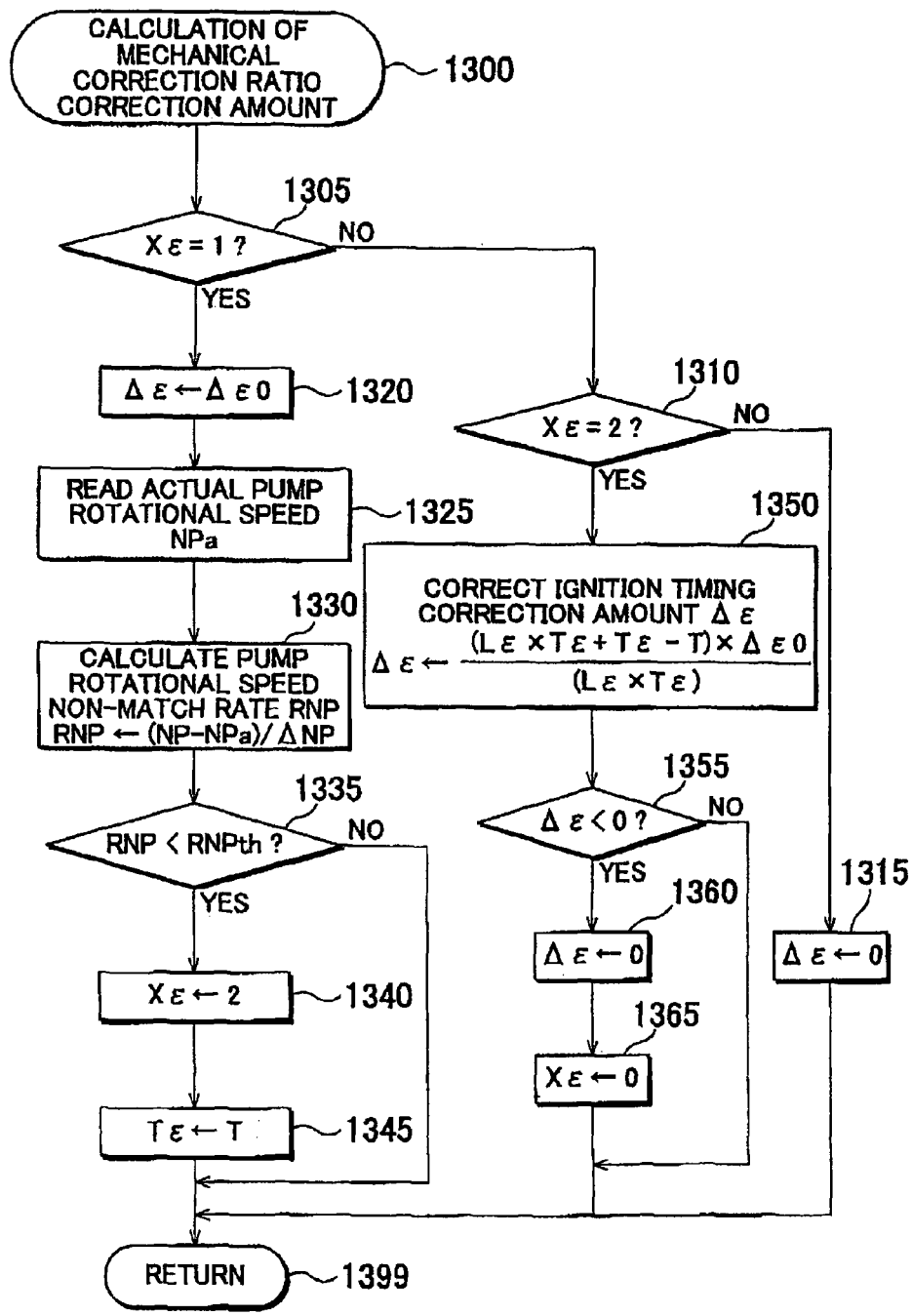
FIG. 13 is a flowchart showing a program that is executed by the CPU to calculate a mechanical compression ratio correction amount according to a second embodiment of the invention, instead of the program shown in FIG. 8.
Figure 14:
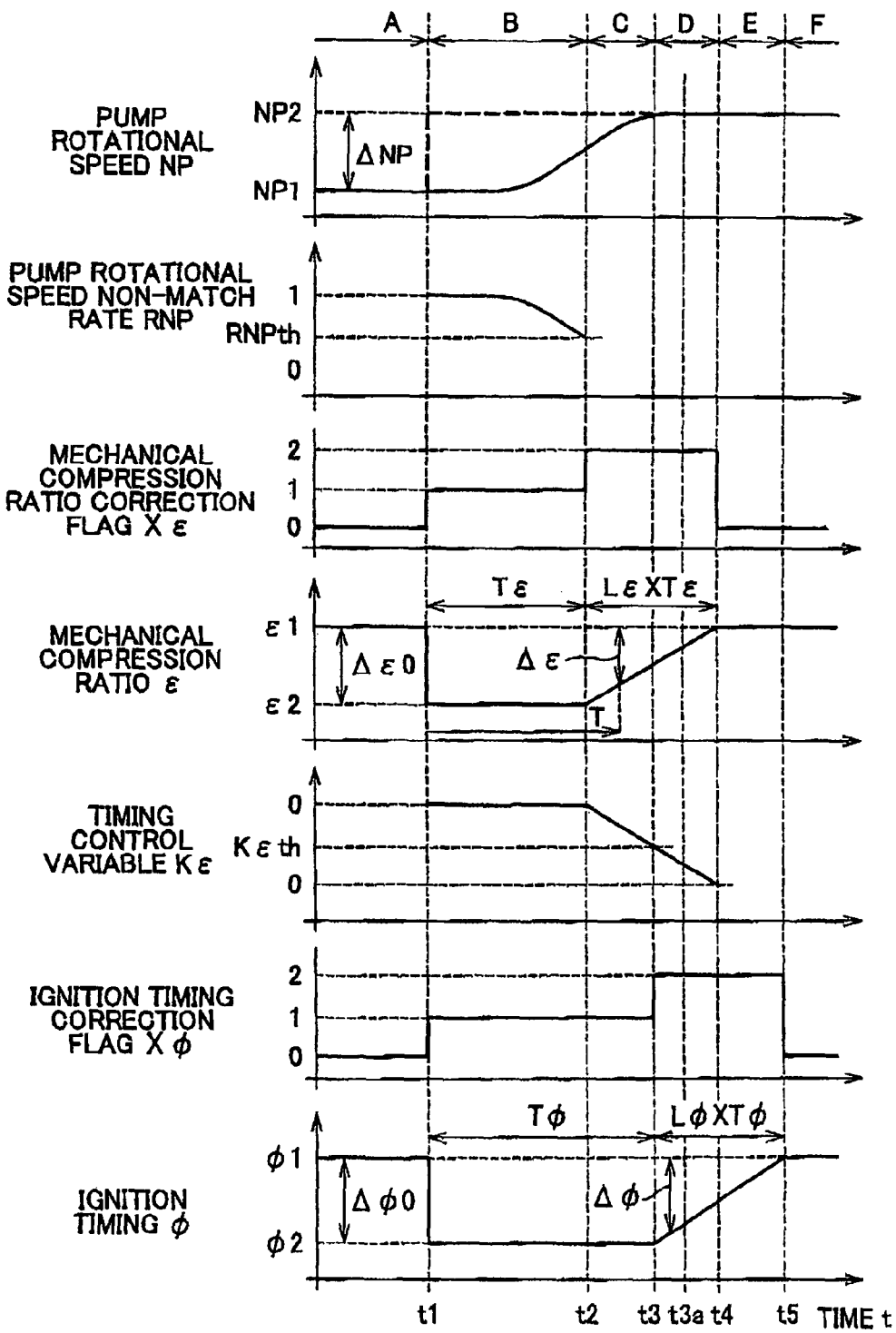
FIG. 14 is a time chart showing changes in the pump rotational speed, the pump rotational speed non-match rate, the mechanical compression ratio correction flag, the mechanical compression ratio, the correction coefficient, the ignition timing correction flag, and the ignition timing.

The control apparatus according to the second embodiment executes a mechanical compression ratio correction amount calculation routine in FIG. 13 instead of the mechanical compression ratio correction amount calculation routine in FIG. 7 according to the first embodiment. FIG. 14 shows the case where knocking occurs for some reason at a time point t1. First, processes executed during a period A before the time point t1 in this case will be described.

When the CPU 71 starts the mechanical compression ratio correction amount calculation routine in FIG. 13 at this time point, the CPU 71 proceeds to step 1305. In step 1305, the CPU 71 determines whether the value of the mechanical compression ratio correction flag Xϵ is "1".

In this situation, knocking does not occur, and therefore, the value of the mechanical compression ratio correction flag Xϵ remains "0". Accordingly, the CPU 71 makes a negative determination in step 1305, and proceeds to step 1310. In step 1310, the CPU 71 determines whether the value of the mechanical compression ratio correction flag Xϵ is "2". Then, the CPU 71 makes a negative determination in step 1310, and proceeds to step 1315. In step 1315, the CPU 71 sets the mechanical compression ratio correction amount Δϵ to "0". Then, the CPU 71 proceeds to step 1399. In step 1399, the CPU 71 finishes the routine.

Thus, as described above, the actual mechanical compression ratio is controlled to the mechanical compression ratio ϵ (=ϵ1) set based on the load of the internal combustion engine 10, at this time point.

Then, at the time point t1, knocking occurs, and therefore, the knocking strength SN becomes higher than the threshold strength SNth. Accordingly, when the CPU 71 executes the knocking determination routine in FIG. 5 at this time point, the ignition timing basic correction amount Δϕ0, the mechanical compression ratio basic correction amount Δϵ0, and the pump rotational speed correction amount ΔNP are set as in the first embodiment (step 515 to step 525). Further, the set pump rotational speed NP is corrected, and the table MapNP is updated (step 530 and step 535). In addition, the value of the ignition timing correction flag Xϕ is set to "1", and the value of the mechanical compression ratio correction flag Xϵ is set "1" (step 540 and step 545). Further, the value of the timer T is set to "0" (step 550).

When the CPU 71 starts the mechanical compression ratio correction amount calculation routine in HG. 13 at this time point, and proceeds to step 1305, the CPU 71 makes an affirmative determination in step 1305, and proceeds to step 1320. In step 1320, the CPU 71 sets the mechanical compression ratio correction amount Δϵ to the mechanical compression ratio basic correction amount Δϵ0 set in step 520.

Then, the CPU 71 proceeds to step 1325. In step 1325, the CPU 71 reads the actual pump rotational speed NPa detected by the pump rotational speed sensor 65. Then, the CPU 71 proceeds to step 1330. In step 1330, the CPU 71 calculates the value (NP−NPa)/ΔNP as the pump rotational speed non-match rate RNP. The value (NP−NPa)/ΔNP is obtained by dividing the value NP−NPa, which is obtained by subtracting the actual pump rotational speed NPa read in step 1325 from the set pump rotational speed NP (NP=NP2 at this time point) set in step 530, by the pump rotational speed correction amount ΔNP set in step 525.

Then, the CPU 71 proceeds to step 1335. In step 1335, the CPU 71 determines whether the pump rotational speed non-match rate RNP calculated in step 1330 is below a predetermined threshold rate RNPth (0.4 in the embodiment). In the embodiment, until the pump rotational speed non-match rate RNP becomes equal to the threshold rate RNPth, the mechanical compression ratio correction amount Δϵ is maintained at the mechanical compression ratio basic correction amount Δϵ0, and therefore, the timing control variable Kϵ (=Δϵ/Δϵ0) is also maintained at "1". That is, the timing control variable Kϵ becomes equal to the threshold value Kϵth at a timing later than a timing at which the pump rotational speed non-match rate RNP becomes equal to the threshold rate RNPth.

At the time point t1, the value NP−NPa is equal to the pump rotational speed correction amount ΔNP, and therefore, the pump rotational speed non-match rate RNP is "1". Accordingly, the CPU 71 makes a negative determination in step 1335, and proceeds directly to step 1399. In step 1399, the CPU 71 finishes the routine.

Thus, at the time point t1, the actual mechanical compression ratio is controlled to the mechanical compression ratio ϵ (=ϵ2) that is lower than the mechanical compression ratio ϵ (=ϵ1) set based on the load of the internal combustion engine 10 by the mechanical compression ratio basic correction amount Δϵ0 set in step 520.

This situation is maintained as long as the pump rotational speed non-match rate RNP is above the threshold rate RNPth. In this situation, the actual pump rotational speed NPa is gradually increased toward the set pump rotational speed NP (=NP2) as time elapses. That is, the pump rotational speed non-match rate RNP gradually decreases. Thus, the flow rate of the coolant is increased. As a result, the cooling efficiency is increased, and therefore, the temperature of the combustion chamber wall surface is decreased.

In contrast, the ignition timing correction amount Δϕ is maintained at the ignition timing basic correction amount Δϕ0 as in the first embodiment. That is, the actual ignition timing continues to be controlled to the ignition timing ϕ2 that is more retarded than the ignition timing ϕ1 set based on the load of the internal combustion engine 10 by the ignition timing basic correction amount Δϕ0.

Then, at a time point t2, the pump rotational speed non-match rate RNP becomes equal to the threshold rate RNPth. In other words, at the time point t2, the actual pump rotational speed NPa becomes equal to the threshold rotational speed NP−RNPth×ΔNP. Thus, when the CPU 71 starts the mechanical compression ratio correction amount calculation routine in FIG. 13 at the time point t2, and proceeds to step 1335, the CPU 71 makes an affirmative determination in step 1335, and proceeds to step 1340. In step 1340, the CPU 71 sets the value of the mechanical compression ratio correction flag Xϵ to "2".

Then, the CPU 71 proceeds to step 1345. In step 1345, the CPU 71 sets a mechanical compression ratio maintenance period Tϵ to the value of the timer T at the current time point. That is, the mechanical compression ratio maintenance period Tε is a period during which the actual compression ratio is maintained at the mechanical compression ratio ε2 that is lower than the mechanical compression ratio ε1 set based on the load of the internal combustion engine 10 by the mechanical compression ratio basic correction amount Δε0. Then, the CPU 71 proceeds to step 1399. In step 1399, the CPU 71 finishes the routine.

Then, after the CPU 71 starts the mechanical compression ratio correction amount calculation routine in FIG. 13 when the crankshaft 25 is rotated by 180 degrees, the CPU 71 makes a negative determination in step 1305, and proceeds to step 1310.

In step 1310, the CPU 71 determines that the value of the mechanical compression ratio correction flag Xε is "2", that is, makes an affirmative determination in step 1310, and proceeds to step 1350. In step 1350, the CPU 71 calculates the mechanical compression ratio correction amount Δε according to the equation (2) described below.

$$\Delta\epsilon = (L\epsilon \times T\epsilon + T\epsilon - T) \times \Delta\epsilon 0 / (L\epsilon \times T\epsilon) \quad (2)$$

In this equation, Lε is a predetermined coefficient (0.8 in the embodiment). As shown in FIG. 14, the mechanical compression ratio correction amount Δε calculated according to the equation (2) is decreased in proportion to the elapsed time. The mechanical compression ratio correction amount Δε is changed from Δε0 to "0" over the period Lε×Tε obtained by multiplying the mechanical compression ratio maintenance period Tε by the coefficient Lε.

Then, the CPU 71 proceeds to step 1355. In step 1355, the CPU 71 determines whether the value of the mechanical compression ratio correction amount Δε is a negative value. At this time point, the value of the mechanical compression ratio correction amount Δε is a positive value. Therefore, the CPU 71 makes a negative determination in step 1355, and proceeds directly to step 1399. In step 1399, the CPU 71 finishes the routine.

Thus, the mechanical compression ratio correction amount Δε continues to be decreased until the mechanical compression ratio correction amount Δε becomes "0", Thus, because the mechanical compression ratio correction amount Δε is decreased as time elapses, the actual mechanical compression ratio is gradually increased toward the mechanical compression ratio ε1 set based on the load of the internal combustion engine 10, as time elapses.

Then, at a time point t3, the timing control variable Kε becomes equal to the threshold value Kεth. Accordingly, when the CPU 71 starts the ignition timing correction amount calculation routine in FIG. 8 at the time point t3, the value of the ignition timing correction flag Xφ is set to "2" (step 835). Further, the ignition timing maintenance period Tφ is set to the value of the timer T at the current time point (step 840).

Then, the CPU 71 executes the ignition timing correction amount calculation routine in FIG. 8 again when the crankshaft 25 is rotated by 180 degrees. Thus, the ignition timing correction amount Δφ is calculated according to the above-described equation (1) (step 845). As described above, the ignition timing correction amount Δφ calculated according to the equation (1) is decreased in proportion to the elapsed time. The ignition timing correction amount Δφ is changed from Δφ0 to "0" over the period Lφ×Tφ obtained by multiplying the ignition timing maintenance period Tφ by the coefficient Lφ. In the embodiment, the coefficient Lφ is set so that the period Lφ×Tφ is equal to the period Lε×Tε.

This situation is maintained until the ignition timing correction amount Δφ becomes "0". Thus, because the ignition timing correction amount Δφ is decreased as time elapses, the actual ignition timing is gradually advanced toward the ignition timing φ1 set based on the load of the internal combustion engine 10, as time elapses.

Then, at a time point t3a, the actual pump rotational speed NPa becomes equal to the pump rotational speed NP (=NP2) set in step 330.

At a time point t4 later than the time point t2 by the period Lε×Tε, the mechanical compression ratio correction amount Δε becomes "0". Thus, after the CPU 71 starts the mechanical compression ratio correction amount calculation routine in FIG. 13 at the time point t4, the CPU 71 makes an affirmative determination in step 1355, and proceeds to step 1360. In step 1360, the CPU 71 sets the mechanical compression ratio correction amount Δε to "0". Subsequently, the CPU 71 sets the value of the mechanical compression ratio correction flag Xε to "0". Then, the CPU 71 proceeds to step 1399, and finishes the routine.

Then, after the CPU 71 starts the mechanical compression ratio correction amount calculation routine in FIG. 13 again when the crankshaft 25 is rotated by 180 degrees, the CPU 71 makes a negative determination in step 1305, and makes a negative determination in step 1310. Thus, the CPU 71 proceeds to step 1315. In step 1315, the CPU 71 sets the mechanical compression ratio correction amount Δε to "0". Subsequently, the CPU 71 finishes the routine in step 1399. Thus, the mechanical compression ratio correction amount Δε continues to be set to "0" until knocking occurs again.

Then, at a time point t5 later than the time point t3 by the period Lφ×Tφ, the ignition timing correction amount Δφ becomes "0". Thus, when the CPU 71 starts the ignition timing correction amount calculation routine in FIG. 8 at the time point t5, the ignition timing correction amount Δφ is set to "0". In addition, the value of the ignition timing correction flag Xφ is set to "0" (step 855 and step 860).

Then, when the CPU 71 starts the ignition timing correction amount calculation routine in FIG. 8 again when the crankshaft 25 is rotated by 180 degrees, the timing correction amount Δφ is set to "0" (step 815). Thus, the ignition timing correction amount Δφ continues to be set to "0" until knocking occurs again.

Thus, when it is determined that knocking occurs (that is, the knocking determination condition is satisfied), the water pump 53 is controlled by increasing the set pump rotational speed NP, at the knocking determination time point t1. Further, the actual mechanical compression ratio is controlled to the low mechanical compression ratio that is lower than the mechanical compression ratio ε1 set based on the load of the internal combustion engine 10, during a period from the knocking determination time point t1 to the time point t4 (i.e., during a period B, a period C, and a period D in FIG. 14). Thus, the pressure of the end gas is decreased, and therefore, occurrence of knocking is suppressed. The period obtained by combining the period B, the period C, and the period D together may be referred to as "low compression ratio control period".

During a period from when the water pump 53 starts to be controlled by increasing the set pump rotational speed NP until when a predetermined delay time elapses, the temperature of the combustion chamber wall surface is substantially constant. Accordingly, the actual mechanical compression ratio is maintained at the constant low mechanical compression ratio (first low mechanical compression ratio) ε2 that is lower than the mechanical compression ratio ε1 set based on the load of the internal combustion engine 10 by the mechanical compression ratio basic correction amount Δε0, during a period from the knocking determination time point t1 to the time point t2 at which the pump rotational speed non-match rate RNP becomes equal to the threshold rate RNPth after the pump rotational speed non-match rate RNP decreases (i.e., during the period B). As a result, it is possible to more reliably suppress occurrence of knocking. The period B in FIG. 14 may be referred to as "first period".

The actual pump rotational speed NPa is gradually increased as time elapses. Accordingly, the cooling efficiency is gradually increased, and therefore, the temperature of the combustion chamber wall surface is gradually decreased. This reduces the possibility of occurrence of knocking.

Accordingly, the actual mechanical compression ratio is controlled to a second low mechanical compression ratio that is higher than the first low mechanical compression ratio $\epsilon 2$ during a period after the time point t2 (i.e., during the period C and the period D in FIG. 14). Thus, as compared to the case where the actual mechanical compression ratio is controlled to the first low mechanical compression ratio $\epsilon 2$ over the entire low compression ratio control period, it is possible to increase the fuel efficiency, while suppressing occurrence of knocking. Further, the second low mechanical compression ratio is gradually increased toward the mechanical compression ratio $\epsilon 1$ set based on the load of the internal combustion engine 10, as time elapses. Thus, as compared to the case where the second low mechanical compression ratio is maintained at a constant value, it is possible to increase the fuel efficiency as much as possible, while more reliably suppressing occurrence of knocking. The period obtained by combining the period C with the period D may be referred to as "second period".

Then, at a time point t3a, the actual pump rotational speed NPa becomes equal to the pump rotational speed NP2 that is higher than the pump rotational speed NP1 set before knocking occurs. Then, at the time point t4, the temperature of the combustion chamber wall surface has been sufficiently decreased, and therefore, the possibility of occurrence of knocking has been sufficiently reduced.

Accordingly, the actual mechanical compression ratio is returned to the mechanical compression ratio $\epsilon 1$ set based on the load of the internal combustion engine 10 during a period after the time point t4 (i.e., during the period E and the period F in FIG. 14). Thus, it is possible to suppress occurrence of knocking, while avoiding the situation where the actual mechanical compression ratio continues to be controlled to the low mechanical compression ratio that is lower than the mechanical compression ratio $\epsilon 1$ set based on the load of the internal combustion engine 10. That is, it is possible to suppress occurrence of knocking, while avoiding inhibition of an increase in the fuel efficiency.

Also, as described above, the mechanical compression ratio starts to be increased at the time point t2 at which the pump rotational speed non-match rate RNP becomes equal to the threshold rate RNPth after the pump rotational speed non-match rate RNP decreases. Thus, the mechanical compression ratio is increased after the cooling efficiency is sufficiently increased. Therefore, it is possible to increase the fuel efficiency, while more reliably suppressing occurrence of knocking. At the time point t2, the actual pump rotational speed NPa (i.e., the rotational speed of the rotor 53b) becomes equal to the threshold rotational speed (i.e., NP−RNPth×ΔNP) corresponding to the threshold rate RNPth. Further, the time point t2 may be referred to as "first time point" in the specification.

In addition, the actual ignition timing is controlled to the ignition timing that is more retarded than the ignition timing $\phi 1$ set based on the load of the internal combustion engine 10 (i.e., the retarded ignition timing), during a period from the knocking determination time point t1 to the time point t5 (i.e., during the period B, the period C, the period D, and the period E in FIG. 14). The period obtained by combining the period B, the period C, the period D, and the period E together may be referred to as "ignition timing retarding control period".

Thus, the pressure of the end gas is decreased, and therefore, occurrence of knocking is suppressed. As a result, it is possible to suppress occurrence of knocking even if the internal combustion engine 10 is operated when the actual mechanical compression ratio is higher than the set mechanical compression ratio during a period immediately after the knocking determination time point t1, because the actual mechanical compression ratio is changed after a control delay time elapses.

Further, the actual ignition timing is maintained at a constant ignition timing (first retarded ignition timing) $\phi 2$ that is more retarded than the ignition timing $\phi 1$ set based on the load of the internal combustion engine 10 by the ignition timing basic correction amount $\Delta\phi 0$, during a period from the knocking determination time point t1 to the time point t3 at which the timing control variable $K\epsilon$ becomes equal to the threshold value $K\epsilon$th after the timing control variable $K\epsilon$ decreases (i.e., during the period B and the period C in FIG. 14). The time point t3 is later than the time point t2 at which the actual mechanical compression ratio starts to be increased. The time point t2 may be referred to as "second time point" in this specification.

Thus, it is possible to suppress occurrence of knocking even when the actual mechanical compression ratio quickly approaches the mechanical compression ratio $\epsilon 1$ set based on the load of the internal combustion engine 10. That is, it is possible to more quickly make the actual mechanical compression ratio approach the mechanical compression ratio $\epsilon 1$ set based on the load of the internal combustion engine 10, while suppressing occurrence of knocking. This increases the fuel efficiency.

Then, the actual ignition timing is gradually advanced from the ignition timing $\phi 2$ toward the ignition timing $\phi 1$ during a period after the time point t3 (i.e., during the period D and the period E in FIG. 14). That is, during the period obtained by combining the period D with the period E, the actual ignition timing is controlled to a second retarded ignition timing that is more advanced than the first retarded ignition timing $\phi 2$. Thus, the fuel efficiency is increased, as compared to the case where the ignition timing is controlled to the first retarded ignition timing $\phi 2$ during this period as well.

As described above, the coefficient $L\phi$ is set so that the period $L\phi \times T\phi$ is equal to the period $L\epsilon \times T\epsilon$. Thus, the ignition timing retarding control ends after the low compression ratio control period ends.

That is, during the period in which the actual mechanical compression ratio is controlled to the low mechanical compression ratio, the actual ignition timing is controlled to the retarded ignition timing. This reduces the possibility of occurrence of knocking. Accordingly, it is possible to avoid occurrence of knocking even when the actual mechanical compression ratio quickly approaches the mechanical compression ratio $\epsilon 1$ set based on the load of the internal combustion engine 10. That is, it is possible to more quickly make the actual mechanical compression ratio approach the mechanical compression ratio $\epsilon 1$ set based on the load of the internal combustion engine 10, while suppressing occurrence of knocking. This increases the fuel efficiency.

As described above, with the control apparatus for the internal combustion engine according to the second embodiment of the invention, it is possible to suppress occurrence of knocking, while avoiding inhibition of an increase in the fuel efficiency.

In the second embodiment, the cooling efficiency is adjusted by changing the flow rate of the coolant supplied to the area near the combustion chamber CC. However, the cooling efficiency may be adjusted by changing the temperature of the coolant.

In this case, the opening degree of the bypass flow rate regulating valve 55a is changed according to the instruction signal from the CPU 71. For example, in the bypass flow rate regulating valve 55a, a heating element that is heatable may be provided in a detecting portion that detects the temperature of the coolant. The bypass flow rate regulating valve 55a may be a valve driven by an actuator, instead of a thermostat valve.

Further, in this case, when the CPU 71 determines that knocking occurs, the CPU 71 transmits the instruction signal to the bypass flow rate regulating valve 55a to decrease the opening degree of the bypass flow rate regulating valve 55a. Thus, the flow rate of the coolant flowing into the radiator 54 is increased, and therefore, the temperature of the coolant is decreased. As a result, the cooling efficiency is increased, and therefore, occurrence of knocking is suppressed.

In addition, in this case, the first time point (i.e., the time point at which the mechanical compression ratio is changed from the first low mechanical compression ratio to the second low mechanical compression ratio that is higher than the first low mechanical compression ratio, in the low compression ratio control period) may be set to a time point at which the coolant temperature becomes equal to a predetermined threshold temperature. Also, the first time point may be set to a time point later than the knocking determination time point by a predetermined period.

In the second embodiment, when knocking occurs in at least one cylinder, the cooling efficiency for the at least one cylinder in which knocking occurs may be made higher than the cooling efficiency for the cooling efficiency for at least one cylinder in which knocking does not occur, as in the modified example of the first embodiment.

The invention is not limited to the above-described embodiments. Various modified examples may be employed in the scope of the invention. For example, in each of the embodiments, the vibration Vc of the cylinder block portion 20 detected by the knock sensor 62 is employed as the index value relating to occurrence of knocking. However, the pressure of gas in the combustion chamber CC (cylinder pressure) may be employed as the index value. In this case, in each of the above-described embodiments, a cylinder pressure sensor that detects the cylinder pressure may be provided, and when the rate of time-dependent change in the cylinder pressure detected by the cylinder pressure sensor is equal to or above a threshold rate, it may be determined that knocking occur.

In each of the above-described embodiments, the condition that knocking occurs is employed as the knocking determination condition. However, a condition that there is a possibility that knocking will occur may be employed as the knocking determination condition.

In this case, in each of the above-described embodiments, the coolant temperature Tw detected by the coolant temperature sensor 61 may be employed as the index value. In addition, when the detected coolant temperature Tw is equal to or above a predetermined threshold temperature, it may be determined that there is a possibility that knocking will occur.

Also, in each of the above-described embodiments, an intake air temperature sensor that detects the temperature of air introduced into the combustion chamber CC (i.e., intake air temperature) may be provided, and the intake air temperature detected by the intake air temperature sensor may be employed as the index value. When the detected intake air temperature is equal to or above a predetermined threshold temperature, it may be determined that there is a possibility that knocking will occur.

In each of the above-described embodiments, a cylinder pressure sensor that detects a cylinder pressure may be provided; the cylinder pressure detected by the cylinder pressure sensor may be employed as the index value; and it may be determined that knocking occurs when the detected cylinder pressure is equal to or higher than a predetermined threshold pressure.

In each of the above-described embodiments, two or more of the coolant temperature Tw, the intake temperature, the cylinder pressure, and the vibration Vc of the cylinder block portion 20 may be employed as the index values. Further, in each of the above-described embodiments, both of the condition that knocking occurs, and the condition that there is a possibility that knocking will occur may be employed as the knocking determination conditions.

Also, in each of the embodiments, when knocking occurs, the ignition timing is controlled to the retarded ignition timing that is more retarded than the ignition timing $\phi 1$ set based on the load of the internal combustion engine 10. However, the ignition timing may be controlled to the ignition timing $\phi 1$ set based on the load of the internal combustion engine 10, regardless of whether knocking occurs.

In each of the above-described embodiments, the crankcase 22 is fixed to the vehicle, and the cylinder block 21 is movable relative to the crankcase 22. However, the cylinder block 21 may be fixed to the vehicle, and the crankcase 22 may be movable relative to the cylinder block 21. In this case, the cylinder block 21 is referred to as "fixed member", and the crankcase 22 is referred to as "movable member". Further, in this case, the water pump 53 may be fixed to the vehicle or the cylinder block 21.

In each of the above-described embodiments, the coolant is used as the cooling medium. However, air may be used as the cooling medium. In this case, the cooling efficiency may be adjusted by changing the flow rate of air flowing around the cylinder block portion 20 and the cylinder head portion 30.

In each of the above-described embodiments, the exhaust valve 34 may be opened so that an actual expansion ratio is increased as the load of the internal combustion engine 10 decreases. In addition, the intake valve 32 may be closed so that an actual compression ratio is maintained at a substantially constant value regardless of the load. Further, the table Map $\epsilon$ may be set so that the mechanical compression ratio $\epsilon$ set based on the table Map $\epsilon$ is equal to or above 20 when the load of the internal combustion engine 10 is low, that is, when the load of the internal combustion engine 10 is equal to or below a threshold load.

In this case, the actual expansion ratio is the ratio of the volume of the combustion chamber CC at a time point at which the exhaust valve 34 is opened, to a top dead center combustion chamber volume that is the volume of the combustion chamber CC at a time point at which the piston 23 is located at the top dead center. The actual compression ratio is the ratio of the volume of the combustion chamber CC at a time point at which the intake valve 32 is closed, to the top dead center combustion chamber volume.

Thus, as the load decreases, the actual expansion ratio is increased, and therefore, a period during which combustion gas generated by burning the mixed gas works on the piston 23 is increased. This increases heat efficiency. As a result, the fuel efficiency is increased.

Further, the actual compression ratio is maintained at a substantially constant value, regardless of the load. As a result, it is possible to avoid an increase in the possibility of occurrence of knocking even when the mechanical compression ratio is increased due to the decrease in the load. Thus, when the load is relatively low, it is possible to increase the fuel efficiency, while suppressing occurrence of knocking.

The invention claimed is:

1. A control apparatus for an internal combustion engine that is provided in a vehicle, and that includes a compression ratio change device that changes an actual mechanical compression ratio, wherein the mechanical compression ratio is a ratio of a maximum value of a volume of a combustion chamber to a minimum value of the volume of the combustion chamber, and the volume of the combustion chamber is changed according to reciprocating movement of a piston, the control apparatus comprising:
  a compression ratio control device that controls the compression ratio change device so that the actual mechanical compression ratio is equal to the mechanical compression ratio set based on a load of the internal combustion engine;
  a cooling device that cools a wall surface that constitutes the combustion chamber using a cooling medium, by supplying the cooling medium to an area near the wall surface, and that adjusts cooling efficiency that indicates a magnitude of heat energy transferred to the supplied cooling medium from the wall surface per unit time;
  an index value obtaining device that obtains an index value relating to occurrence of knocking; and
  a knocking suppression device that determines whether a knocking determination condition which includes at least one of a condition that knocking occurs and a condition that there is a possibility that knocking will occur, is satisfied based on the obtained index value, wherein when the knocking suppression device determines that the knocking determination condition is satisfied, the knocking suppression device controls the cooling device to increase the cooling efficiency, and controls the compression ratio change device so that the actual mechanical compression ratio is equal to a low mechanical compression ratio that is lower than the mechanical compression ratio set based on the load, in a predetermined low compression ratio control period that starts at a knocking determination time point at which it is determined that the knocking determination condition is satisfied, wherein
  the knocking suppression device sets the low mechanical compression ratio to a first low mechanical compression ratio during a first period from the knocking determination time point to a predetermined first time point, in the low compression ratio control period,
  the knocking suppression device sets the low mechanical compression ratio to a second low mechanical compression ratio that is higher than the first low mechanical compression ratio during a second period after the first time point, in the low compression ratio control period,
  the knocking suppression device maintains the first low mechanical compression ratio at a constant value during the first period, and
  the knocking suppression device gradually increases the second low mechanical compression ratio toward the mechanical compression ratio set based on the load, as time elapses, during the second period.

2. The control apparatus for the internal combustion engine according to claim 1, wherein
  the cooling medium is a coolant;
  the cooling device includes an electric pump to which electric power is supplied, and which includes a rotor that is rotated at a rotational speed corresponding to the electric power supplied to the pump;
  when the rotor is rotated, the pump supplies the coolant to the area near the wall surface by discharging the coolant at a higher flow rate as the rotational speed of the rotor becomes higher; and
  the knocking suppression device controls the cooling device by controlling the electric power supplied to the pump, and sets the first time point to a time point at which the rotational speed of the rotor becomes equal to a predetermined threshold rotational speed.

3. The control apparatus for the internal combustion engine according to claim 1, wherein
  the cooling device adjusts the cooling efficiency by changing a flow rate of the supplied cooling medium.

4. The control apparatus for the internal combustion engine according to claim 1, wherein
  the cooling medium is a coolant; and
  the cooling device includes an electric pump that supplies the coolant to the area near the wall surface by discharging the coolant when the pump is driven by electric power.

5. The control apparatus for the internal combustion engine according to claim 4, wherein
  in the internal combustion engine, a fixed member, which is one of a cylinder block and a crankcase, is fixed to the vehicle, and a movable member, which is the other of the cylinder block and the crankcase, is movable relative to the fixed member;
  the compression ratio change device changes the actual mechanical compression ratio by moving the movable member relative to the fixed member; and
  the pump is fixed to a member that is not moved relative to the fixed member when the compression ratio change device changes the actual mechanical compression ratio.

6. The control apparatus for the internal combustion engine according to claim 1, wherein
  the cooling medium is a coolant;
  the cooling device includes an electric pump to which electric power is supplied, and which includes a rotor that is rotated at a rotational speed corresponding to the electric power supplied to the pump;
  when the rotor is rotated, the pump supplies the coolant to the area near the wall surface by discharging the coolant at a higher flow rate as the rotational speed of the rotor becomes higher; and
  the knocking suppression device controls the cooling device by controlling the electric power supplied to the pump, and increases the low mechanical compression ratio as the rotational speed of the rotor increases.

7. The control apparatus for the internal combustion engine according to claim 1, wherein
  the cooling device adjusts the cooling efficiency by changing a temperature of the supplied coolant.

8. The control apparatus for the internal combustion engine according to claim 1, wherein
  the index value obtaining device obtains the index value by detecting at least one of a temperature of the cooling medium, a temperature of air introduced into the combustion chamber, a pressure of gas in the combustion chamber, and vibration of the internal combustion engine as the index value.

9. The control apparatus for the internal combustion engine according to claim 1, further comprising:
  an ignition device that ignites mixed gas formed in the combustion chamber; and an ignition timing control device that controls the ignition device so that the ignition device actually ignites the mixed gas at an ignition timing set based on the load, wherein when the knocking suppression device determines that the knocking determination condition is satisfied, the knocking suppression device controls the ignition device so that the ignition device actually ignites the mixed gas at a retarded ignition timing that is more retarded than the ignition timing set based on the load, in a predetermined ignition timing retarding control period that starts at the knocking determination time point.

10. The control apparatus for the internal combustion engine according to claim 1, wherein the knocking suppression device sets the retarded ignition timing to a first retarded ignition timing during a period until a second time point that is later than a time point at which the actual mechanical compression ratio starts to be increased, in the ignition timing retarding control period; and the knocking suppression device sets the retarded ignition timing to a second retarded ignition timing that is more advanced than the first retarded ignition timing during a period after the second time point, in the ignition timing retarding control period.

11. The control apparatus for the internal combustion engine according to claim 10, wherein the knocking suppression device sets an end time point of the ignition timing retarding control period to a time point after an end time point of the low compression ratio control period.

12. The control apparatus for the internal combustion engine according to claim 1, wherein the compression ratio control device sets the mechanical compression ratio based on the load so that the mechanical compression ratio is increased as the load decreases;

the compression ratio control device opens an exhaust valve so that an actual expansion ratio is increased as the load decreases;

the actual expansion ratio is a ratio of the volume of the combustion chamber at a time point at which the exhaust valve is opened to a top dead center combustion chamber volume that is the volume of the combustion chamber at a time point at which the piston is located at a top dead center;

the compression ratio control device closes an intake valve so that an actual compression ratio is maintained at a substantially constant value regardless of the load; and the actual compression ratio is a ratio of the volume of the combustion chamber at a time point at which the intake valve is closed, to the top dead center combustion chamber volume.

13. The control apparatus for the internal combustion engine according to claim 1, wherein the internal combustion engine is a multi-cylinder internal combustion engine that includes a plurality of cylinders;

the compression ratio change device simultaneously changes the actual mechanical compression ratio of each of the cylinders to a same value;

the index value obtaining device obtains the index value for each of the cylinders;

the cooling device adjusts the cooling efficiency for each of the cylinders;

the knocking suppression device determines whether the knocking determination condition is satisfied based on the obtained index value for each of the cylinders;

when the knocking suppression device determines that the knocking determination condition is satisfied in at least one cylinder among the cylinders the knocking suppression device controls the cooling device so that the cooling efficiency for the at least one cylinder in which the knocking determination condition is satisfied is higher than the cooling efficiency for at least one cylinder among the cylinders, in which the knocking determination condition is not satisfied.

14. A control apparatus for an internal combustion engine that is provided in a vehicle, and that includes a compression ratio change device that changes an actual mechanical compression ratio, wherein the mechanical compression ratio is a ratio of a maximum value of a volume of a combustion chamber to a minimum value of the volume of the combustion chamber, and the volume of the combustion chamber is changed according to reciprocating movement of a piston, the control apparatus comprising:

a cooling device that cools a wall surface that constitutes the combustion chamber using a cooling medium, by supplying the cooling medium to an area near the wall surface, and that adjusts cooling efficiency that indicates a magnitude of heat energy transferred to the supplied cooling medium from the wall surface per unit time;

an index value obtaining device that obtains an index value relating to occurrence of knocking; and a compression ratio control device that controls the compression ratio change device so that the actual mechanical compression ratio is equal to the mechanical compression ratio set based on a load of the internal combustion engine, wherein said compression ratio control device sets the mechanical compression ratio based on the load so that the mechanical compression ratio is increased as the load decreases, and closes an intake valve so that an actual compression ratio is maintained at a substantially constant value regardless of the load, and further comprising:

a knocking suppression device that determines whether a knocking determination condition which includes at least one of a condition that knocking occurs and a condition that there is a possibility that knocking will occur, is satisfied based on the obtained index value, wherein when the knocking suppression device determines that the knocking determination condition is satisfied, the knocking suppression device controls the cooling device to increase the cooling efficiency.

15. The control apparatus for the internal combustion engine according to claim 14, wherein the knocking suppression device sets the mechanical compression ratio to a first low mechanical compression ratio during a first period from the knocking determination time point to a predetermined first time point, in a low compression ratio control period; and the knocking suppression device sets the mechanical compression ratio to a second low mechanical compression ratio that is higher than the first low mechanical compression ratio during a second period after the first time point, in the low compression ratio control period.

16. The control apparatus for the internal combustion engine according to claim 15, wherein the knocking suppression device maintains the first low mechanical compression ratio at a constant value during the first period; and the knocking suppression device gradually increases the second low mechanical compression ratio toward the mechanical compression ratio set based on the load, as time elapses, during the second period.

17. The control apparatus for the internal combustion engine according to claim 14, wherein
the cooling medium is a coolant;
the cooling device includes an electric pump to which electric power is supplied, and which includes a rotor that is rotated at a rotational speed corresponding to the electric power supplied to the pump;
when the rotor is rotated, the pump supplies the coolant to the area near the wall surface by discharging the coolant at a higher flow rate as the rotational speed of the rotor becomes higher; and
the knocking suppression device controls the cooling device by controlling the electric power supplied to the pump, and sets the first time point to a time point at which the rotational speed of the rotor becomes equal to a predetermined threshold rotational speed.

18. The control apparatus for the internal combustion engine according to claim 14, wherein
the cooling device adjusts the cooling efficiency by changing a flow rate of the supplied cooling medium.

19. The control apparatus for the internal combustion engine according to claim 14, wherein
the cooling medium is a coolant; and
the cooling device includes an electric pump that supplies the coolant to the area near the wall surface by discharging the coolant when the pump is driven by electric power.

20. The control apparatus for the internal combustion engine according to claim 14,
wherein
in the internal combustion engine, a fixed member, which is one of a cylinder block and a crankcase, is fixed to the vehicle, and a movable member, which is the other of the cylinder block and the crankcase, is movable relative to the fixed member;
the compression ratio change device changes the actual mechanical compression ratio by moving the movable member relative to the fixed member; and
the pump is fixed to a member that is not moved relative to the fixed member when the compression ratio change device changes the actual mechanical compression ratio.

21. The control apparatus for the internal combustion engine according to claim 14, wherein
the cooling medium is a coolant;
the cooling device includes an electric pump to which electric power is supplied, and which includes a rotor that is rotated at a rotational speed corresponding to the electric power supplied to the pump;
when the rotor is rotated, the pump supplies the coolant to the area near the wall surface by discharging the coolant at a higher flow rate as the rotational speed of the rotor becomes higher; and
the knocking suppression device controls the cooling device by controlling the electric power supplied to the pump, and increases the mechanical compression ratio as the rotational speed of the rotor increases.

22. The control apparatus for the internal combustion engine according to claim 14, wherein
the cooling device adjusts the cooling efficiency by changing a temperature of the supplied coolant.

23. The control apparatus for the internal combustion engine according to claim 14,
wherein
the index value obtaining device obtains the index value by detecting at least one of a temperature of the cooling medium, a temperature of air introduced into the combustion chamber, a pressure of gas in the combustion chamber, and vibration of the internal combustion engine as the index value.

24. The control apparatus for the internal combustion engine according to claim 14, further comprising:
an ignition device that ignites mixed gas formed in the combustion chamber; and
an ignition timing control device that controls the ignition device so that the ignition device actually ignites the mixed gas at an ignition timing-set based on the load, wherein
when the knocking suppression device determines that the knocking determination condition is satisfied, the knocking suppression device controls the ignition device so that the ignition device actually ignites the mixed gas at a retarded ignition timing that is more retarded than the ignition timing set based on the load, in a predetermined ignition timing retarding control period that starts at the knocking determination time point.

25. The control apparatus for the internal combustion engine according to claim 14, wherein
the knocking suppression device sets the retarded ignition timing to a first retarded ignition timing during a period until a second time point that is later than a time point at which the actual mechanical compression ratio starts to be increased, in the ignition timing retarding control period; and
the knocking suppression device sets the retarded ignition timing to a second retarded ignition timing that is more advanced than the first retarded ignition timing during a period after the second time point, in the ignition timing retarding control period.

26. The control apparatus for the internal combustion engine according to claim 25, wherein
the knocking suppression device sets an end time point of the ignition timing retarding control period to a time point after an end time point of a low compression ratio control period.

27. The control apparatus for the internal combustion engine according to claim 14, wherein
the compression ratio control device sets the mechanical compression ratio based on the load so that the mechanical compression ratio is increased as the load decreases;
the compression ratio control device opens an exhaust valve so that an actual expansion ratio is increased as the load decreases;
the actual expansion ratio is a ratio of the volume of the combustion chamber at a time point at which the exhaust valve is opened, to a top dead center combustion chamber volume that is the volume of the combustion chamber at a time point at which the piston is located at a top dead center;
the compression ratio control device closes an intake valve so that an actual compression ratio is maintained at a substantially constant value regardless of the load; and
the actual compression ratio is a ratio of the volume of the combustion chamber at a time point at which the intake valve is closed, to the top dead center combustion chamber volume.

28. The control apparatus for the internal combustion engine according to claim 14, wherein
the internal combustion engine is a multi-cylinder internal combustion engine that includes a plurality of cylinders;

the compression ratio change device simultaneously changes the actual mechanical compression ratio of each of the cylinders to a same value;

the index value obtaining device obtains the index value for each of the cylinders;

the cooling device adjusts the cooling efficiency for each of the cylinders;

the knocking suppression device determines whether the knocking determination condition is satisfied based on the obtained index value for each of the cylinders;

when the knocking suppression device determines that the knocking determination condition is satisfied in at least one cylinder among the cylinders the knocking suppression device controls the cooling device so that the cooling efficiency for the at least one cylinder in which the knocking determination condition is satisfied is higher than the cooling efficiency for at least one cylinder among the cylinders, in which the knocking determination condition is not satisfied.

29. The control apparatus for the internal combustion engine according to claim 1, wherein the first period is adjacent to the second period.

30. The control apparatus for the internal combustion engine according to claim 1, wherein the first period is less than half the second period.

31. The control apparatus for the internal combustion engine according to claim 1, wherein the first period is less than one-third the second period.

32. The control apparatus for the internal combustion engine according to claim 1, wherein the first period is less than one-fourth the second period.

* * * * *